(12) United States Patent
Langrell

(10) Patent No.: US 12,349,661 B2
(45) Date of Patent: Jul. 8, 2025

(54) PORTABLE LIVESTOCK CORRAL WITH DUAL AND SINGLE ALLEY MODES OF OPERATION, BUD BOX CAPABILITY, AND TRANSPORT SAFETY BAR

(71) Applicant: Northquip Inc., Woodlands (CA)

(72) Inventor: Stephen Arthur Langrell, Woodlands (CA)

(73) Assignee: Northquip Inc., Winnipeg (CA)

( * ) Notice: Subject to any disclaimer, the term of this patent is extended or adjusted under 35 U.S.C. 154(b) by 0 days.

(21) Appl. No.: 18/145,161

(22) Filed: Dec. 22, 2022

(65) Prior Publication Data

US 2023/0337628 A1    Oct. 26, 2023

(30) Foreign Application Priority Data

Sep. 29, 2022 (CA) ...................................... 3177667

(51) Int. Cl.
*A01K 3/00* (2006.01)
*B60P 3/00* (2006.01)

(52) U.S. Cl.
CPC ................ *A01K 3/001* (2021.08); *B60P 3/00* (2013.01)

(58) Field of Classification Search
None
See application file for complete search history.

(56) References Cited

U.S. PATENT DOCUMENTS

| | | | |
|---|---|---|---|
| 6,450,124 B1 * | 9/2002 | Calvert | A01K 3/00 119/512 |
| 2010/0300373 A1 * | 12/2010 | Kell | A01K 1/00 119/512 |
| 2013/0320168 A1 * | 12/2013 | Peacemaker | F16M 13/02 248/226.11 |
| 2015/0075442 A1 * | 3/2015 | Wilson | A01K 3/00 119/512 |

* cited by examiner

*Primary Examiner* — Joshua J Michener
*Assistant Examiner* — Henry Hooper Mudd
(74) *Attorney, Agent, or Firm* — Kyle R. Satterthwaite; Ryan W. Dupuis; Ade & Company Inc.

(57) ABSTRACT

A portable livestock corral features a central alleyway subdivided into two alleys and having two sets of foldable corral panels for forming livestock pens on opposing sides of the alleyway. On either side of the alleyway, a bud box is selectively deployable at a corner of the respective livestock pen that resides across from an openable/closable alleyway side-gate of the other pen, whereby loading of the alleyway from either pen can exploit such a bud box. Inside the alleyway, an internal swing gate is lockable in different positions to enable opening of both alleys, or selectively closure of either one of the two alleys, which can serve as a livestock-free zone safely occupiable of a human operator. In transport mode, a safety bar with deployable stops at its opposing ends mechanically restrains the folded-up corral panels on both sides of the alleyway for optimal road safety.

23 Claims, 16 Drawing Sheets

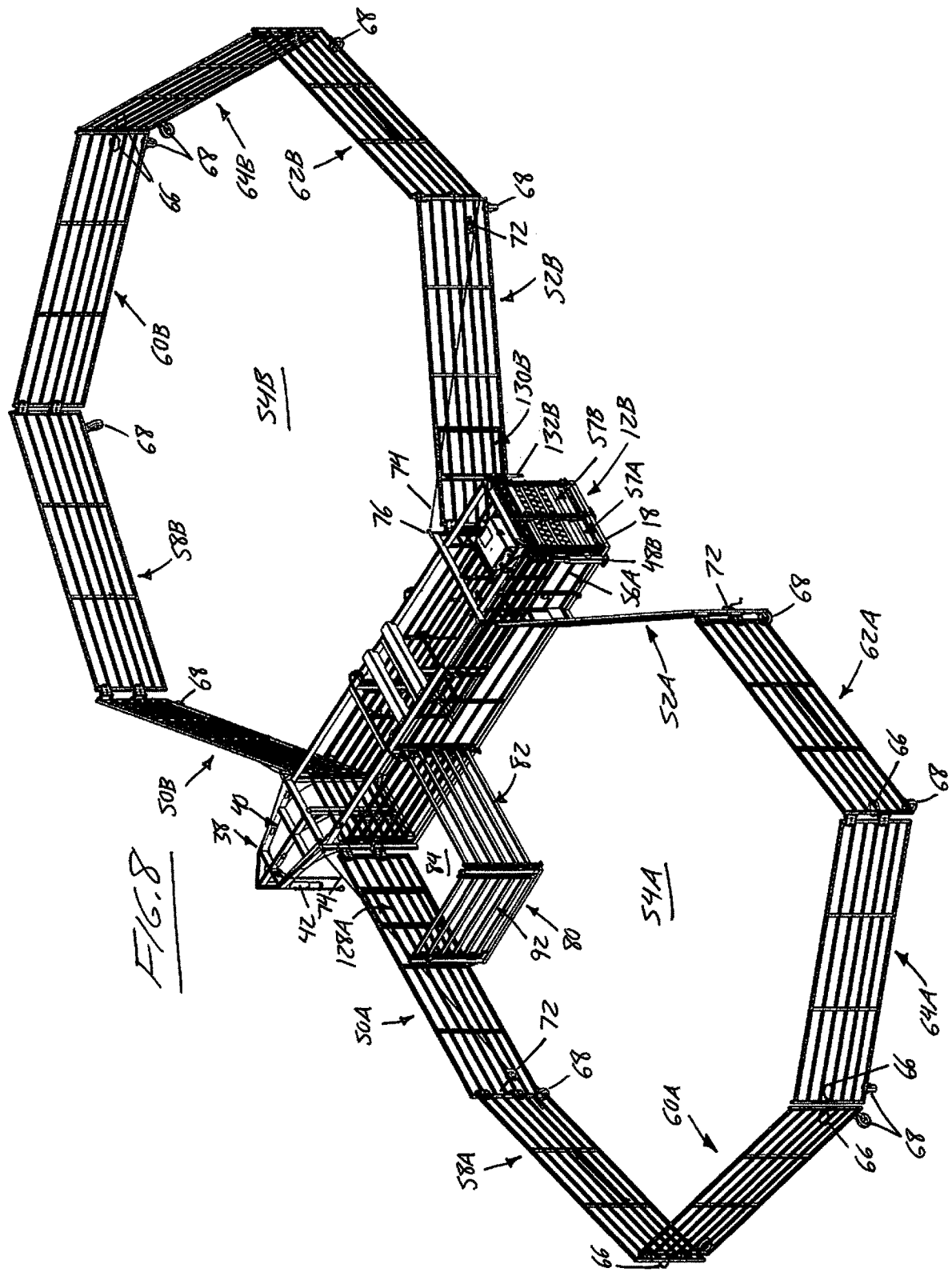

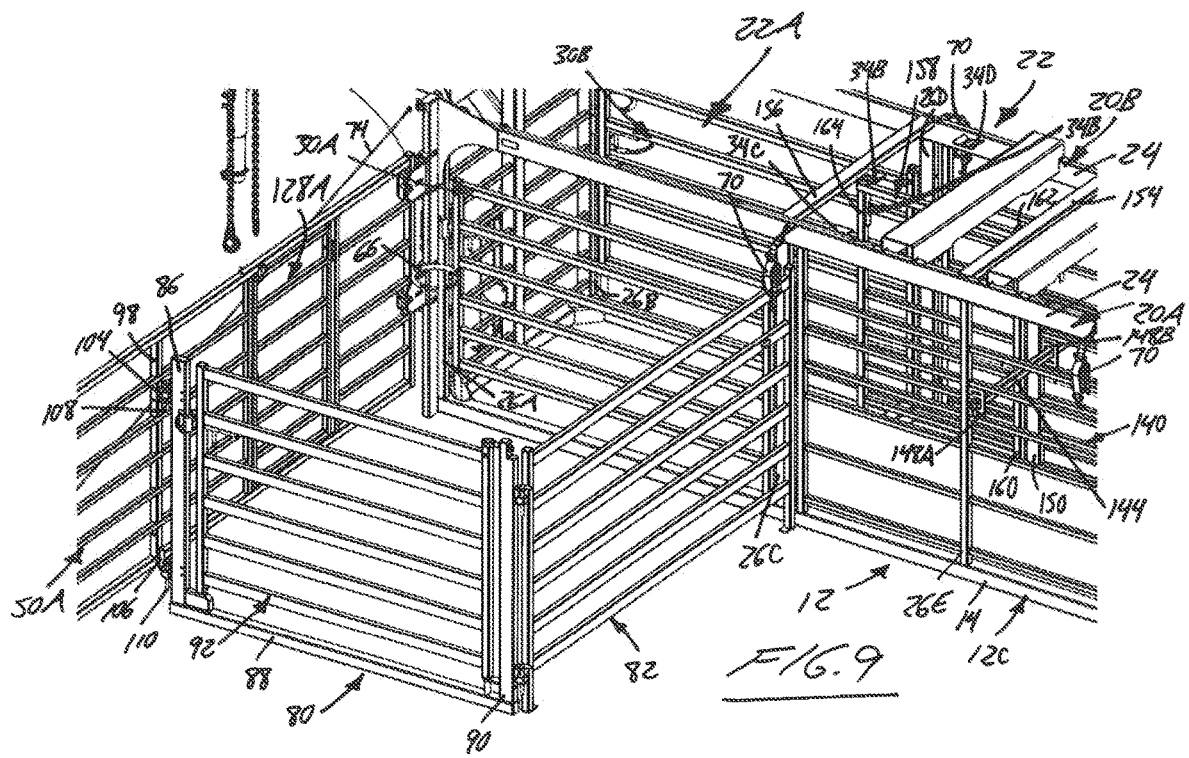
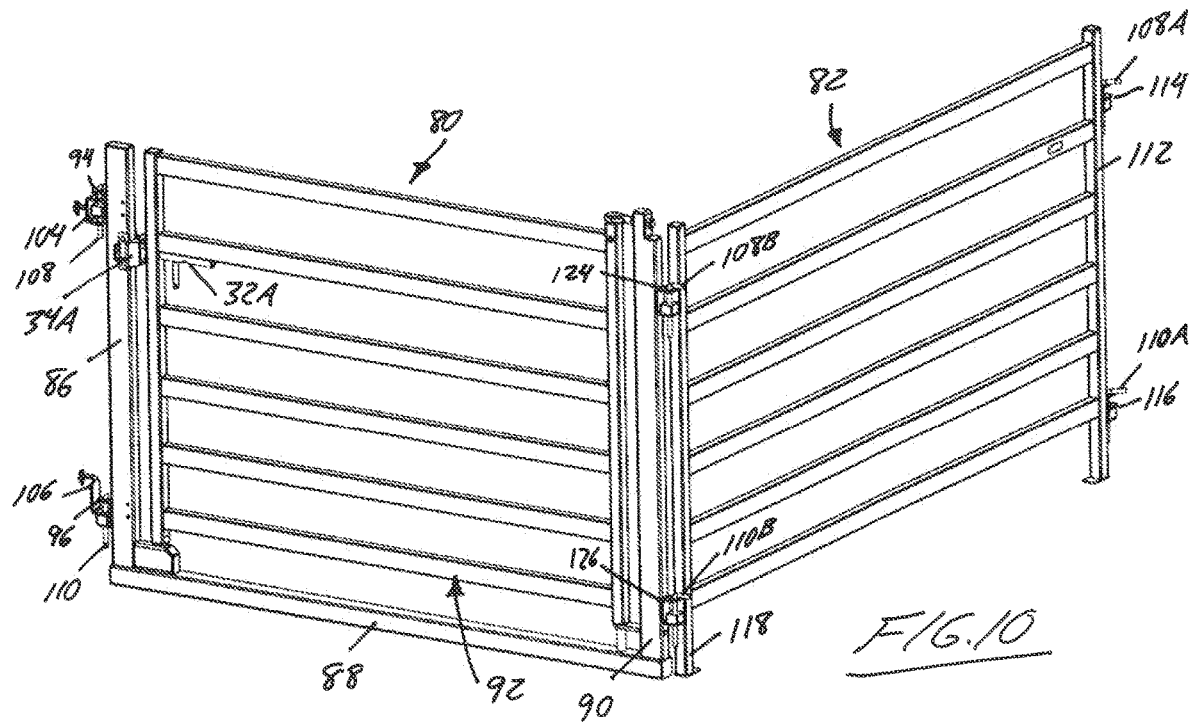

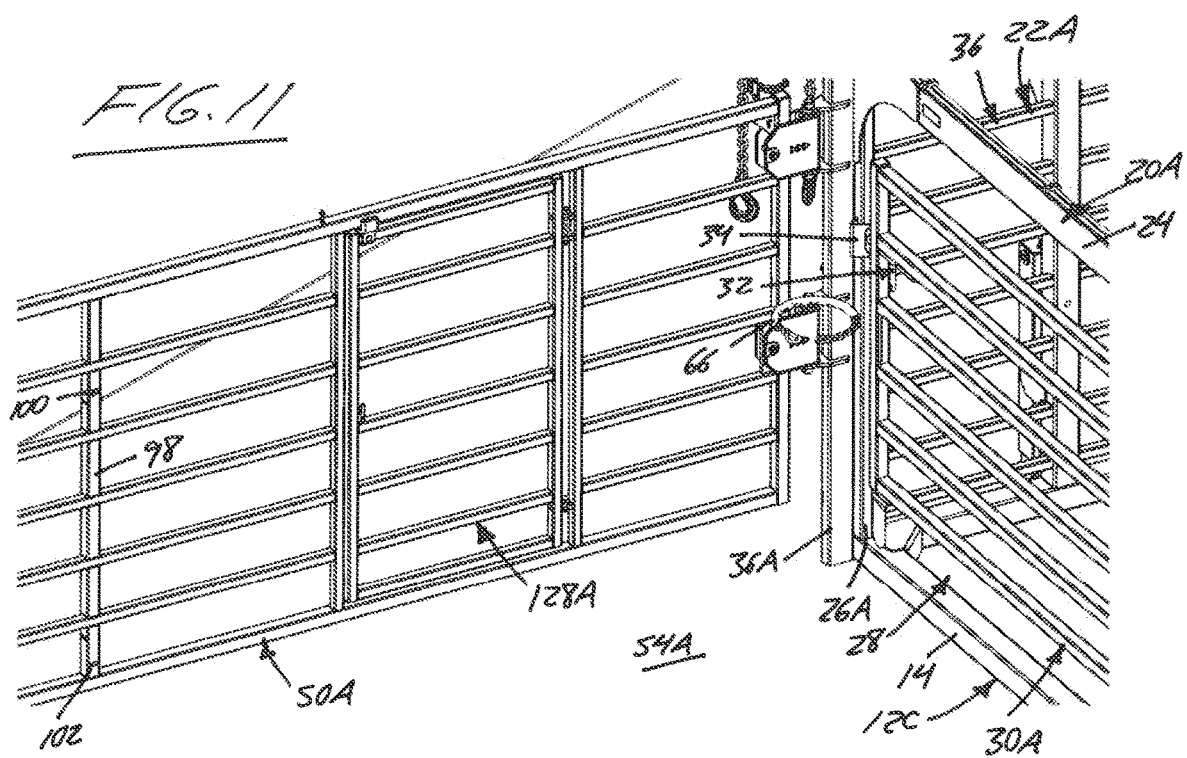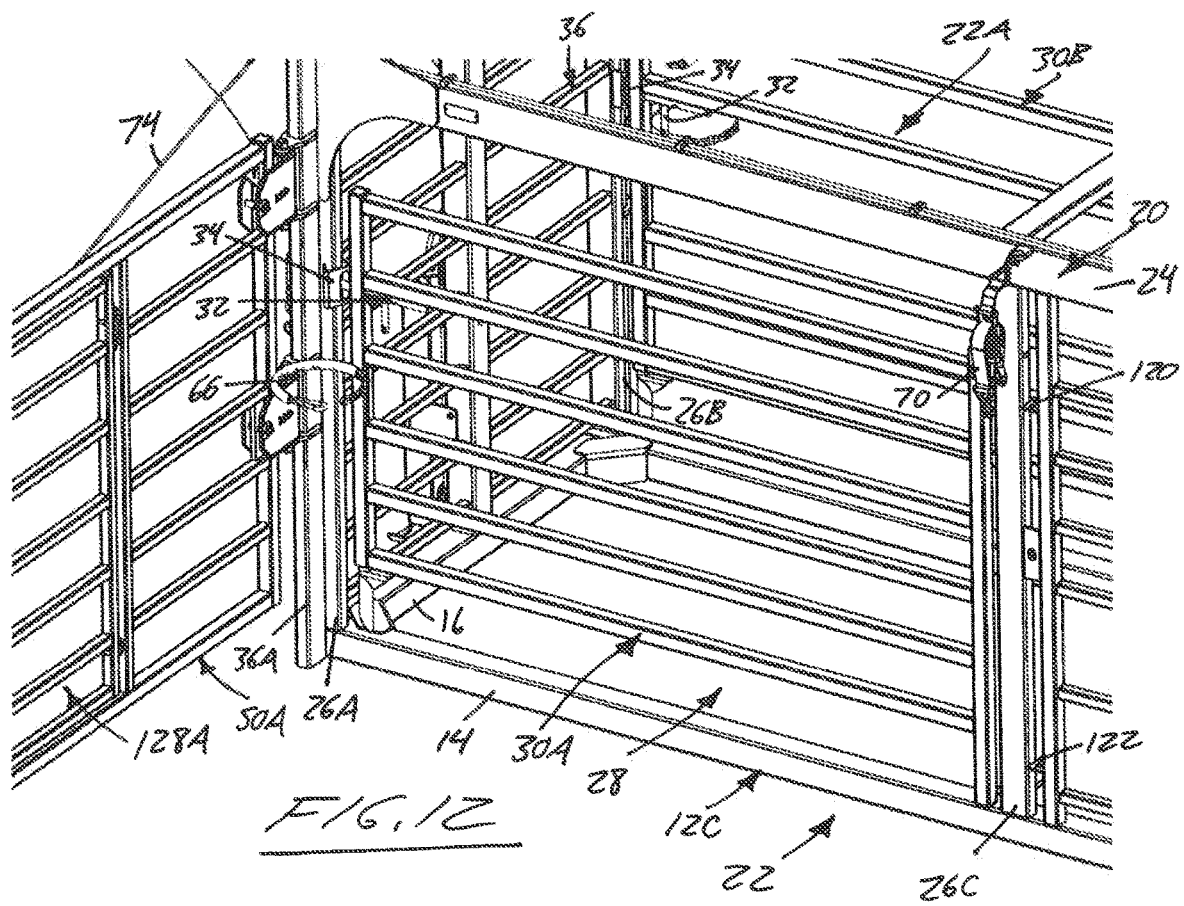

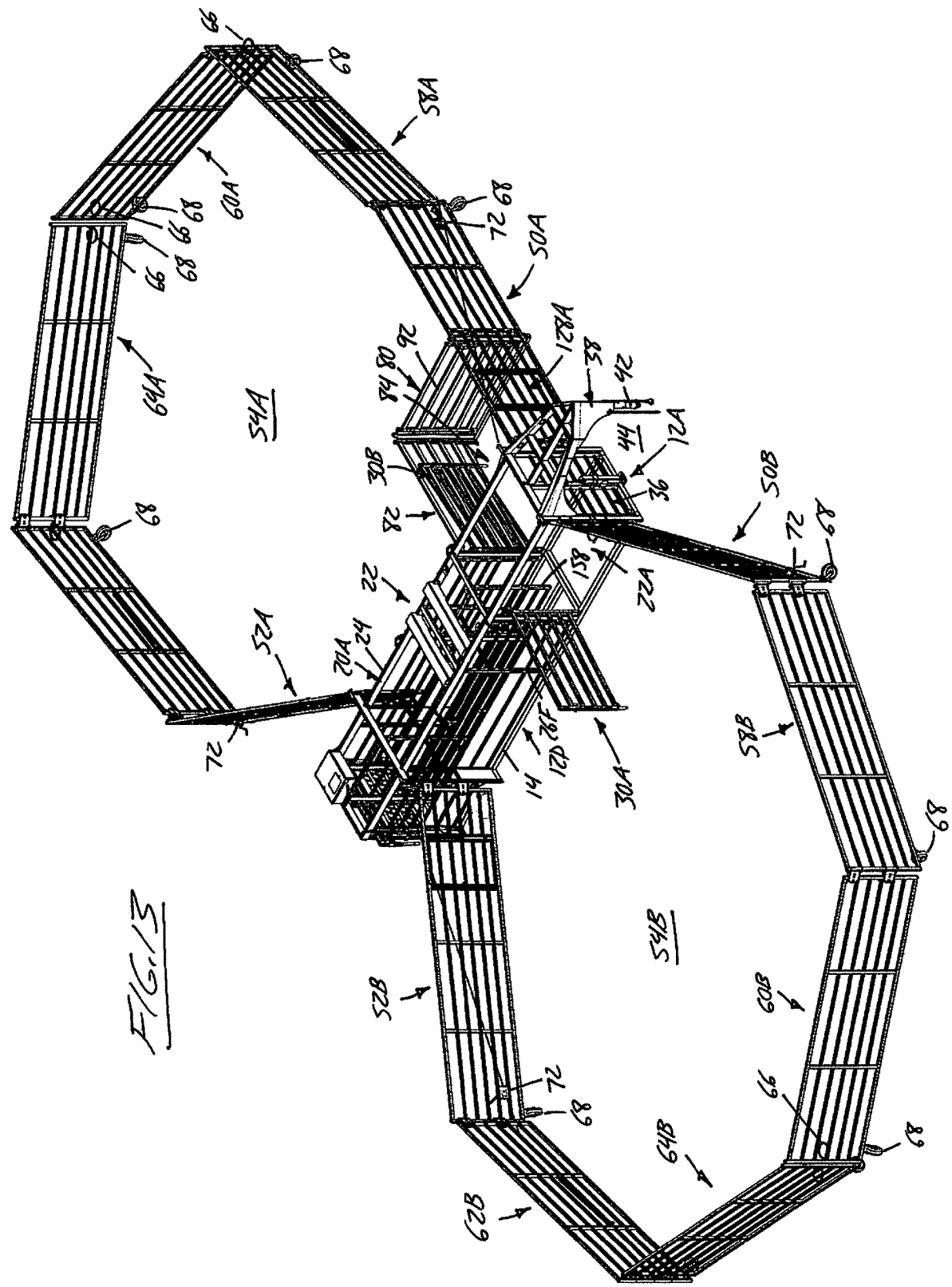

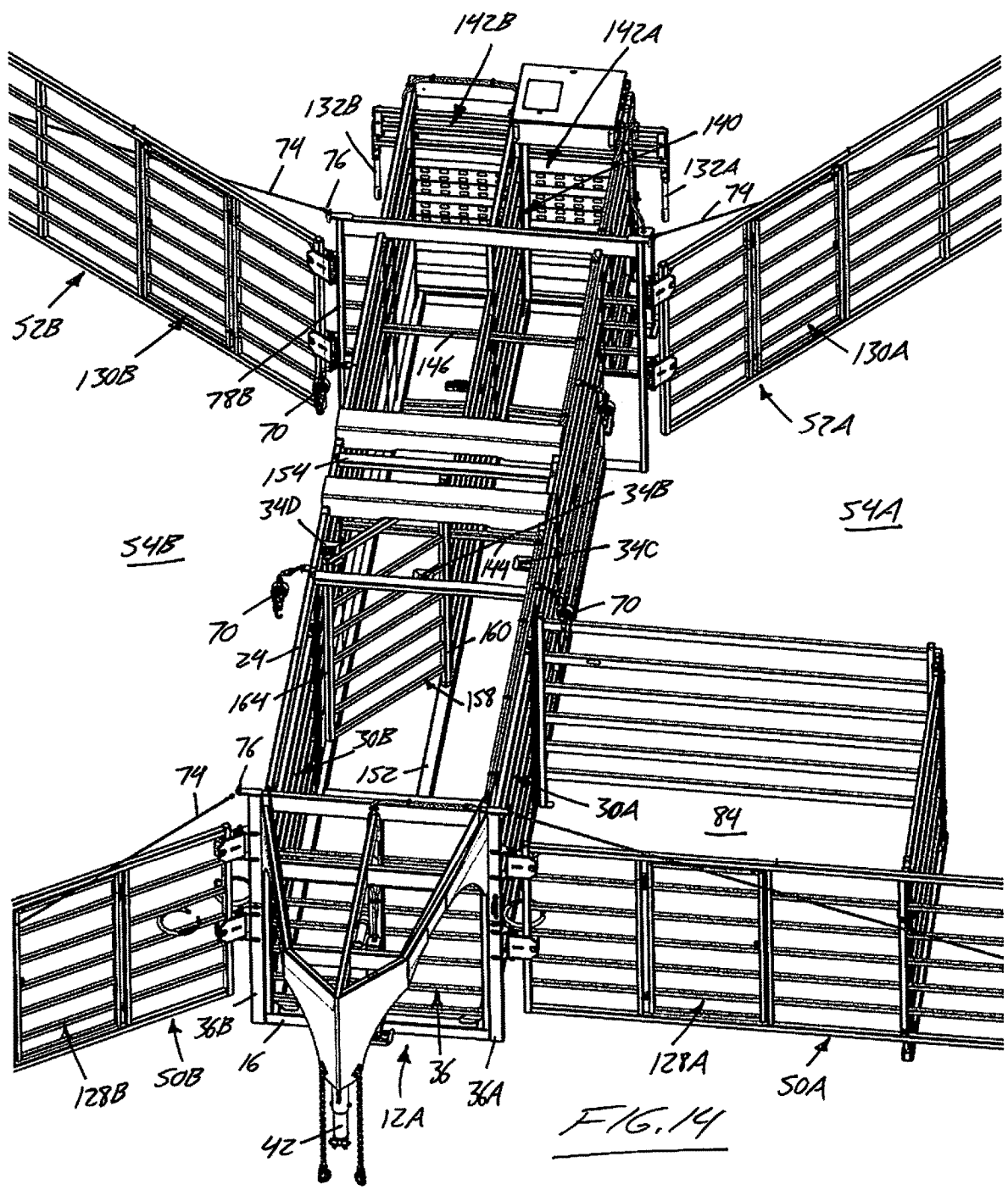

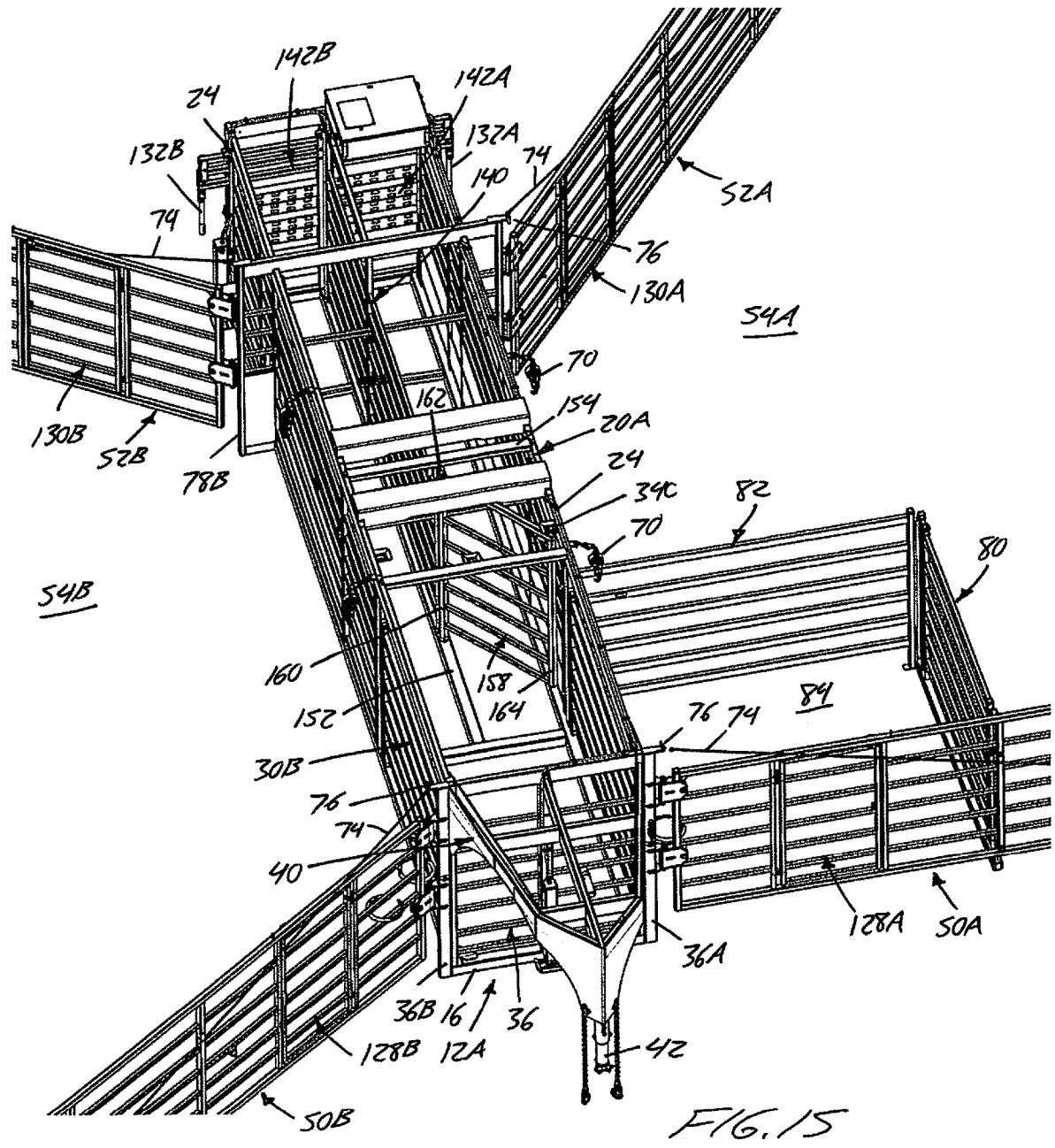

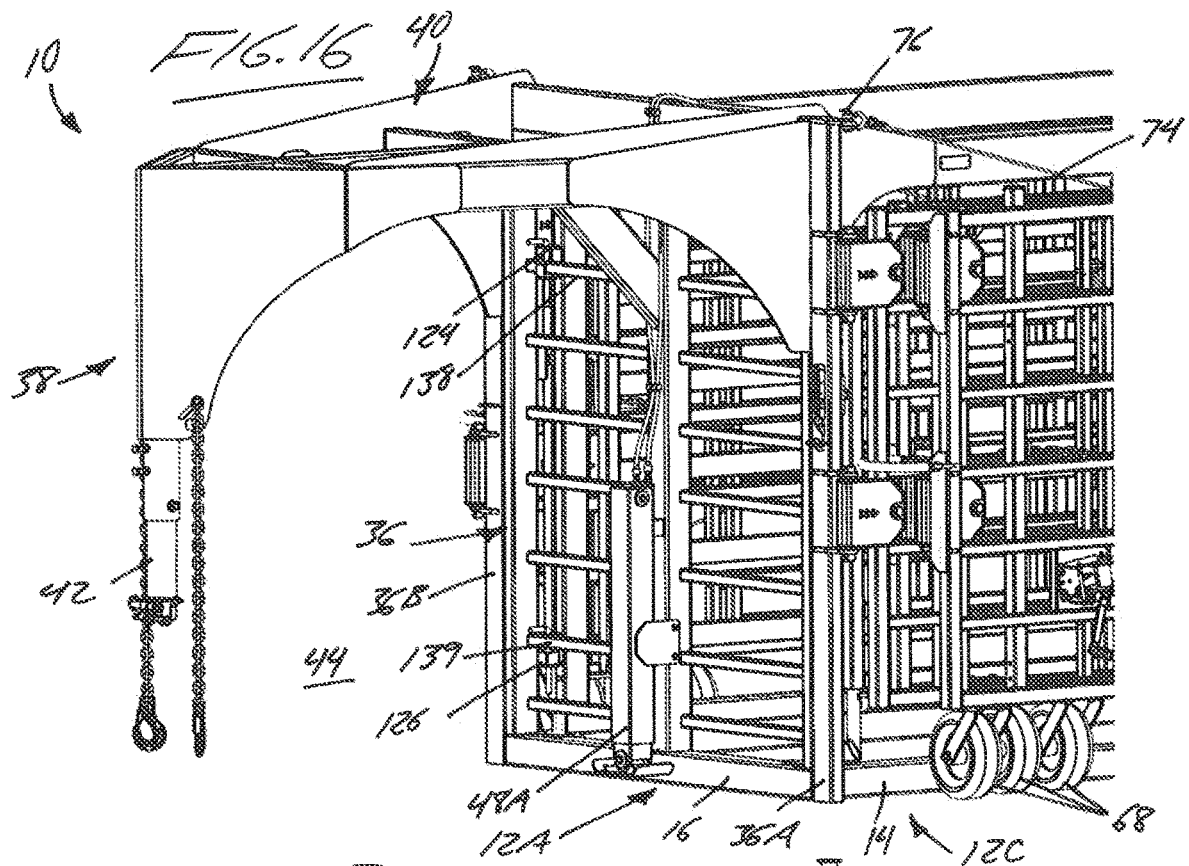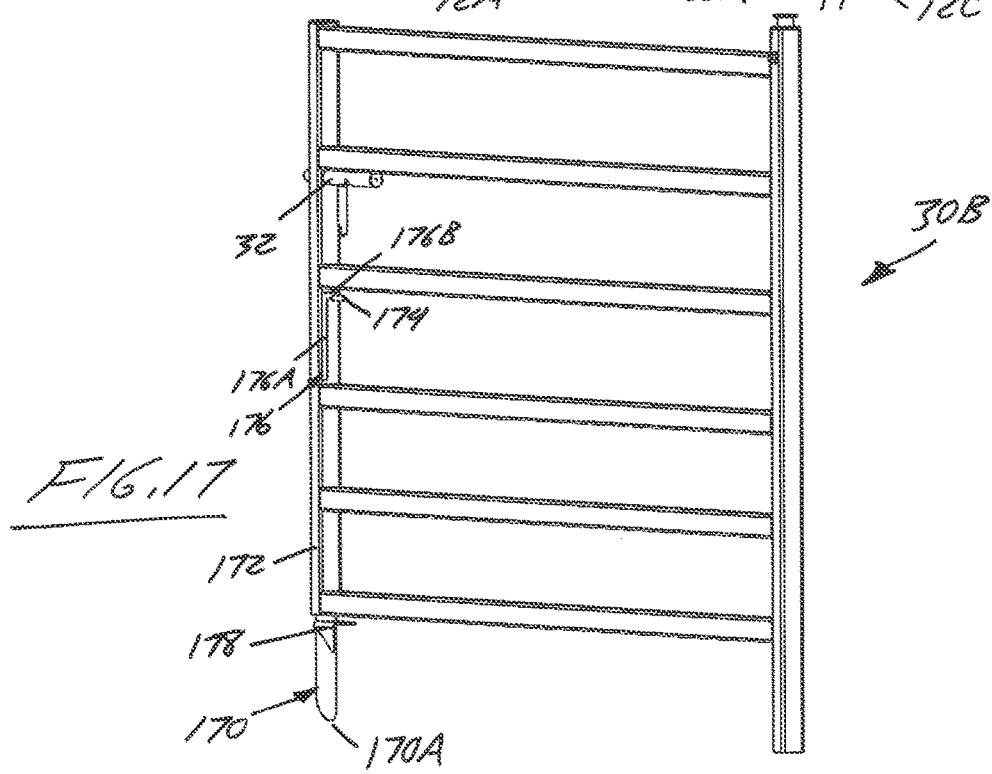

PORTABLE LIVESTOCK CORRAL WITH DUAL AND SINGLE ALLEY MODES OF
OPERATION, BUD BOX CAPABILITY, AND
TRANSPORT SAFETY BAR

CROSS-REFERENCE TO RELATED
APPLICATIONS

This application claims foreign priority benefit under 35 U.S.C. 119(a) of Canadian Patent Application No. 3,177,667, filed Sep. 29, 2022, the entirety of which is incorporated herein by reference.

FIELD OF THE INVENTION

The present invention relates generally to portable livestock handling equipment, and more particularly to livestock corrals and alleyways, and combinations thereof, especially in a transportable form.

BACKGROUND

While there have been different designs of portable livestock corrals in the prior art, the features and reconfigurability thereof to encompass various livestock handling operations and techniques within a singular transportable apparatus have been notably limited, leaving much room for improvements in terms of equipment capacity, equipment capability, and efficiency of use. Applicant has developed a novel design of portable corral with several unique aspects that address such shortcomings of the portable corrals of the past, at least some of which may also be put to beneficial use in the broader context of livestock handing equipment as a whole, whether portable or not.

SUMMARY OF THE INVENTION

According to a first aspect of the invention, there is provided a portable livestock corral comprising:
- a towable frame of elongated character in a longitudinal direction, said towable frame having two ends of opposing relation to one another in said longitudinal direction, and first and second sides of opposing relation to one another in a lateral direction of transverse relation to said longitudinal direction;
- first and second sidewall structures of erect relationship to said towable frame at the first and second sides thereof, respectively, and thereby respectively denoting first and second sides of a longitudinally oriented alleyway delimited between said first and second sidewall structures;
- a first openable/closable wall section installed in the first sidewall structure, through which livestock are selectively admissible into the alleyway from the first side thereof;
- a second openable/closable wall section installed in the second sidewall structure, through which livestock are selectively admissible into the alleyway from the second side thereof;
- a collection of panels stowable in a manner carried by said towable frame for transport therewith, said collection of panels including:
- a first set of corral panels deployable externally of the alleyway outside the first sidewall structure thereof to cooperatively delimit a first livestock pen from which the livestock are admissible to the alleyway through said first openable/closable wall section;
- a second set of corral panels deployable externally of the alleyway outside the second sidewall structure thereof to cooperatively delimit a second livestock pen residing across the alleyway from said first livestock pen, and from which the livestock are admissible to the alleyway through said second openable/closable wall section; and
- a set of bud box panels deployable in a first working position outside the alleyway at the first side thereof in a position across from the second openable/closable wall section to create an enclosed bud box for use routing of the livestock from the second livestock pen into the alleyway via the second openable/closable wall section.

Preferably the bud box panels are configured for selective and detachable connection to other components of the livestock corral in the first work working position.

Preferably said set of bud box panels is also selectively deployable in a second working position outside the alleyway at the second side thereof in a position across from the first openable/closable wall section for alternate use of the enclosed bud box during routing of the livestock from the first livestock pen into the alleyway via the first openable/closable wall section.

Preferably a first one of the bud box panels is connected or connectable to a corral panel among the first set of corral panels, and a second one of the bud box panels is connected or connectable to a sidewall component of the alleyway at the first side thereof.

Preferably said sidewall component of the alleyway is an upright post of the first sidewall structure that neighbors the first openable/closable wall section therein.

Preferably the set of bud box panels consists solely of said first one and said second one of the bud box panels.

Preferably said first one of the bud box panels is configured for detachable connection to said corral panel.

Preferably said second one of the bud box panels is configured for detachable connection to said sidewall component of the alleyway.

Preferably at least one of the bud box panels is a gated bud box panel that comprises an openable/closable gate therein.

Preferably said bud box panels are configured to place the gated bud box panel in opposing and facing relation to the second openable/closable wall section when said bud box panels are in the first working position.

Preferably said first one of the bud box panels is a gated bud box panel.

Preferably the bud box panels are configured to occupy an interior of the first livestock pen in the first working position, whereby the enclosed bud box is a partial alleyway-adjacent area of the first livestock pen that is divided from a remainder of the first livestock pen by the deployed bud box panels.

Preferably the first set of corral panels include a gated corral panel with an openable/closable man gate that, in the working position of the bud box panels, is openable to gain human access the enclosed bud box.

Preferably the alleyway is of a dual-alley configuration having a divider wall that subdivides at least a partial length of the alleyway into two neighbouring alleys running longitudinally alongside one another.

Preferably a safety bar is included for mechanical constraint of the first and second sets of corral panels in stowed transport positions respectively folded up alongside the first and second sidewall structures, said safety bar being insertable through aligned openings the sets of corral panels and the sidewall structures to attain a working position spanning collectively therethrough in the lateral direction, and comprising a pair of stops usable at or adjacent respective ends of the safety bar in said working position to both block sliding of the safety bar out of said working position, and block outward swinging of stowed corral panels.

According to a second aspect of the invention, there is provided a transport safety device for mechanically retaining folded sets of corral panels in stowed positions folded up alongside opposing sidewall structures of an alleyway of a portable livestock corral, said device comprising an elongated safety bar insertable through aligned openings the folded sets of corral panels and the sidewall structures to attain a working position spanning collectively therethrough, and comprising a pair of stops usable at or adjacent respective ends of the safety bar in said working position to block sliding of the safety bar out of said working position.

In one embodiment, at least one of the stops comprises a slotted stop member with a slot therein that is penetrated by a pivot shaft that also penetrates a main elongated member of the safety bar near the respective end thereof, the slotted stop member being slidable and pivotable relative to the pivot shaft for manipulation between an orientation lying transversely of the safety bar in the stopping position, and parallel to the safety bar in the release position.

According to a third aspect of the invention, there is provided a portable livestock corral comprising:
  a towable frame of elongated character in a longitudinal direction, said towable frame having two ends of opposing relation to one another in said longitudinal direction, and first and second sides of opposing relation to one another in a lateral direction of transverse relation to said longitudinal direction;
  first and second sidewall structures of erect relationship to said towable frame at the first and second sides thereof, respectively, and thereby respectively denoting first and second sides of a longitudinally oriented alleyway delimited between said first and second sidewall structures;
  a collection of corral panels stowable in a manner carried by said towable frame for transport therewith, and deployable externally of the alleyway in cooperating relationship therewith to delimit at least one livestock pen from which livestock are admissible into to the alleyway via at least one openable/closable entrance thereto;
  wherein the alleyway is of a dual-alley configuration having a divider wall that subdivides at least a partial length of the alleyway into two neighbouring alleys running longitudinally alongside one another.

Preferably said dual-alley configuration is further characterized by inclusion of a dual-gate setup at one of the two opposing ends of said alleyway, where the dual-gate setup has two independently operable gates that respectively terminate the two neighbouring alleys, and are openable and closable independently of one another.

Preferably, at least one of the two neighbouring alleys, at an end thereof nearest to the at least one openable/closable entrance of the alleyway, is selectively openable and closable to permit and prevent access to the at least one alley by the livestock entering the alleyway through the at least one openable/closable entrance, whereby selective closure of said at least one of the two neighbouring alleys is operable to create a livestock-free zone inside the alleyway for safe occupation thereof by a human operator.

Preferably said at least one openable/closable entrance comprises two openable/closable entrances respectively disposed at the opposing first and second sides of the alleyway.

Preferably said at least openable/closable entrance comprises at least one swingable side-gate of the alleyway.

Preferably said dual-alley configuration is further characterized by inclusion of at least one lockable gate at said end of the neighbouring alleys nearest to the at least one openable/closable entrance, and said lockable gate is movable between, and lockable in each of, a plurality of different positions operable to open and close said at least one of the two neighbouring alleys.

According to a fourth aspect of the invention, there is provided a livestock alley system comprising:
  erectly standing first and second sidewall structures of horizontally spaced apart relation to one another to denote first and second sides of a longitudinally oriented alleyway delimited between said first and second sidewall structures;
  an erectly standing divider wall that subdivides at least a partial length of the alleyway into two neighbouring alleys running longitudinally alongside one another; and
  at one end of said neighbouring alleys, at least one lockable gate movable between, and lockable in each of, a plurality of different positions operable to open and close at least one of the two neighbouring alleys.

Preferably said different positions of the lockable gate include two different single-alley closing positions each closing off only a respective one of the two neighbouring alleys.

Preferably said different positions include a fully open position in which both of the two neighbouring alleys are open.

Preferably said at least one lockable gate is a singular gate.

Preferably said lockable gate is a swing gate pivotable about an upright axis between said plurality of different positions.

Preferably said lockable gate is configured to form an inline extension of the divider wall, when opened.

Preferably the alleyway includes a swing section delimited between said first and second sidewall structures beyond an end of the divider wall nearest thereto, and the at least one lockable gate is operable to selectively open and close access to said at least one of the two neighbouring alleys from said swing section.

Preferably said swing section is at least as wide as a collective width of the two neighbouring alleys.

Preferably the alleyway, at a section thereof situated across the swing section from the two neighbouring alleys, comprises at least one openable/closable entrance through which livestock are admissible into the alleyway and through the swing section into said at least one of the two neighbouring alleys.

BRIEF DESCRIPTION OF THE DRAWINGS

Preferred embodiments of the invention will now be described in conjunction with the accompanying drawings in which:

FIG. 8 is a top rear left perspective view of the portable livestock corral of FIG. 7.

FIG. 9 is a partial top rear left perspective view of the portable livestock corral of FIG. 8, zoomed in on the setup bud box assembly.

FIG. 10 is an isolated view of two bud box panels and associated mounting hardware of the bud box assembly from FIGS. 7 through 9.

FIG. 11 is a partial top rear left perspective view of the portable livestock corral of FIG. 5, zoomed in at a corner of the left livestock pen where the bud box assembly is subsequently setup in FIGS. 7 through 9.

FIG. 12 is another partial top rear left perspective view of the portable livestock corral, zoomed in on the same corner as FIG. 11, but at a different viewing angle to reveal other features of the corral.

FIG. 13 is another top front right perspective view of the portable livestock corral of FIG. 7, but in a more specific working mode thereof with alleyway side-gates in open positions enabling livestock flow into the bud box, and onward therefrom into the alleyway.

FIG. 14 is a partial top front left perspective view of the portable livestock corral of FIG. 7, zoomed in on the alleyway to better reveal a dual-alley configuration thereof, and showing an internal swing-gate thereof in a single-alley closing position closing off one of two neighbouring alleys of the alleyway.

FIG. 15 is a partial top front right perspective view of the portable livestock corral of FIG. 14, but with the internal swing-gate of the alleyway in another single-alley closing position closing off the other of the two neighbouring alleys.

FIG. 16 is a partial front left perspective end view of the portable livestock corral of FIG. 1.

FIG. 17 is an isolated perspective view of one of two identical alleyway side-gates of the portable livestock corral, illustrating a movable ground stake thereof that is operable to anchor said side-gate in an open position.

DETAILED DESCRIPTION

Figure 1:
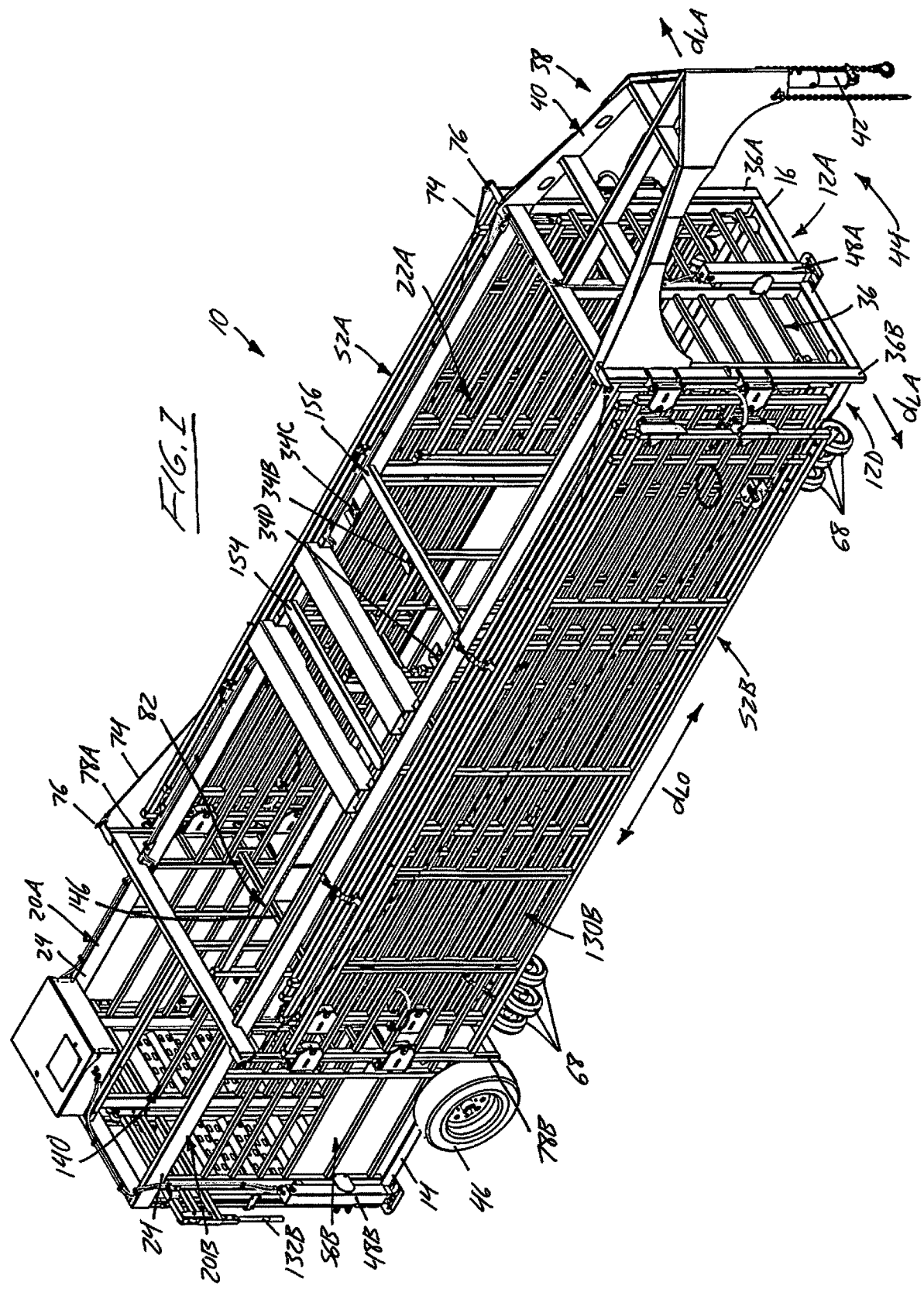
FIG. 1 is a top front right perspective view of a portable livestock corral of the present invention in a transport mode thereof.

The novel and inventive portable livestock corral 10 shown in the appended drawings has a towable frame 12 of elongated character in a longitudinal direction $d_{LO}$ in which opposing front and rear ends 12A, 12B of the frame are spaced apart in distal relationship to one another. A lateral direction $d_{LA}$ lies perpendicularly transverse of the longitudinal direction $d_{LO}$ in a horizontal reference plane, and the frame 12 has left and right sides 12C, 12D of opposing relation to one another in this lateral direction. FIGS. 1 through 4 show the corral 10 in a collapsed transport mode for towed road travel, while FIGS. 5 through 12 show the corral 10 in an expanded field mode. For the purpose of initially describing the various componentry of the corral 10, attention is drawn to FIGS. 5 through 12 which better reveal the individual components and their purposeful and functional relationships to one another. The frame 12 features two lengthwise beams 14 each running in the longitudinal direction at a respective one of the frame's left and right sides of the, a front cross-beam 16 spanning perpendicularly between the lengthwise beams 14 in the lateral direction at the front end 12A of the frame, and a rear cross-beam 18 spanning perpendicularly between the lengthwise beams 14 in the lateral direction at the rear end 12B of the frame.

Left and right sidewall structures 20A, 20B of erect relationship to the towable frame 12 reside at the first and second sides 12C, 12D thereof, respectively, and thereby respectively denote first and second sides of a longitudinally oriented alleyway 22 delimited between the two structures 20. Each sidewall structure 20A, 20B features a lengthwise header 24 residing overhead of the respective lengthwise beam 14 of the frame 12 in elevated relation thereto, and a series of upright frame posts spanning perpendicularly between the lengthwise frame beam 14 and header 24 at longitudinally spaced intervals therealong between the front and rear ends of the frame 12. Of these frame posts a front frame posts 26A, 26B of each sidewall structure 20A, 20B resides at or nearest the front end 12A of the frame 12, and a side-gate frame post 26C, 26D of each sidewall structure 20A, 20B resides next closest to the front end of the frame 12, as best shown in FIGS. 9 and 12.

The area horizontally delimited between each neighbouring pair of frame posts and vertically delimited between the lengthwise frame beam 14 and respective header 24 in each sidewall structure 20A, 20B denotes a respective sidewall area of the alleyway 22 in which a respective sidewall section is installed to define a lateral boundary of a respective segment of the alleyway. In the frontmost sidewall area 28 between the front frame post 26A, 26B and the neighbouring side-gate frame post 26C, 26D an openable/closable sidewall section is embodied by a movable alleyway side-gate 30A, 30B hinged to the side-gate frame post 26C, 26D for swingable movement relative thereto about an upright hinge axis. Each alleyway side-gate 30A, 30B is movable about this axis between a closed position occupying the frontmost side wall area 28 between the front frame post 26A, 26B and the neighbouring side-gate frame post 26C, 26D, thereby closing off the respective side of a frontmost alleyway section 22A delimited between the two frontmost sidewall areas 28, an out-swung open position spanning laterally out from the respective side of the alleyway 22 in non-obstructing relation to the interior space of the alleyway, and an in-swung open position spanning laterally across the interior space of the alleyway and through the frontmost sidewall area 28 at the opposing side of the alleyway 22 (when permitted by an open position of the other alleyway side-gate way installed therein). Each alleyway side-gate 30A, 30B has a spring-loaded slam latch 32 at its swingable free end for automatically latched connection to a latch catch 34 on the frontmost frame post 26A, 26B in the closed position of the alleyway side-gate 30A, 30B for automatic locking thereof in the closed position. Through selective opening and closing of these two alleyway side-gates 30A, 30B by one or more human operators, livestock can be permitted to enter the frontmost section 22A of the alleyway 22 from either of the two opposing sides thereof.

At the front end 12A of the frame 12, the alleyway 22 is terminated by an erect end wall assembly 36 standing upright from the front cross-beam 16 and spanning laterally between the two sidewall structures 20A, 20B to denote a closed front end of the alleyway 22. As used herein, the term "closed" is used to denote a barrier through which livestock cannot pass, but not necessarily a solidly opaque structure, as demonstrated by the skeletal form of the illustrated end wall assembly 36 composed of a set of horizontal bars spanning laterally across the front end of the alleyway 22 between upright outer posts 36A, 36B of the end wall assembly 36, which respectively neighbour the front frame posts 26A, 26B just outside the lengthwise frame beams 14 of the frame 12. A gooseneck towing arrangement 38 is also installed at the front end of the alleyway 22, and features an overhang structure 40 that cantilevers longitudinally forward from the top of the end wall assembly 36, and a coupler post 42 that depends downwardly from the cantilevered overhang structure 40 at a forward end thereof situated distally of the end wall assembly 36 at the front end 12A of the frame 12. This way, an open walkthrough area 44 is left between the end wall assembly 36 and the coupler post 42 beneath the overhang structure 40 of the gooseneck towing arrangement 38 outside the closed front end of the alleyway 22.

Figure 7:
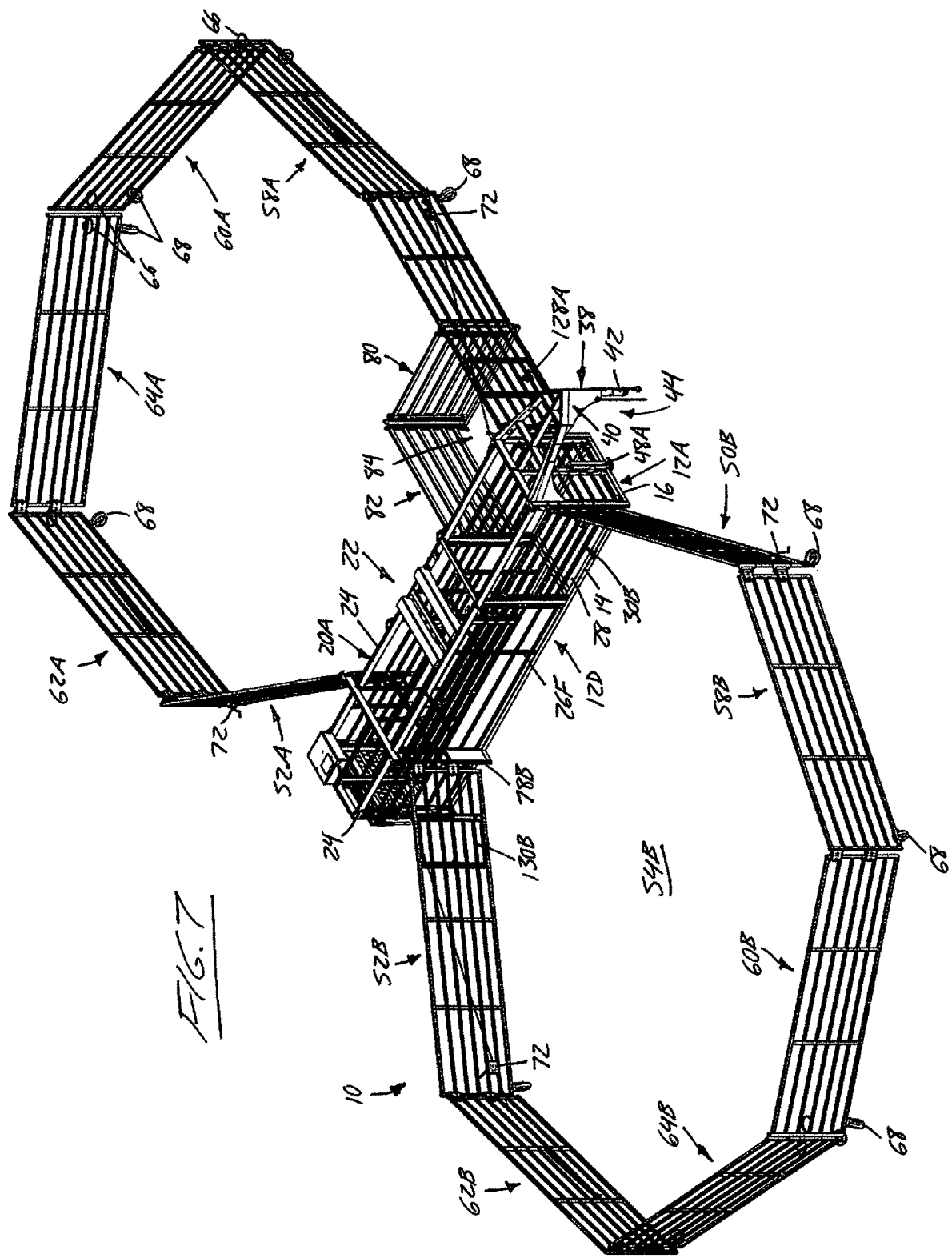
FIG. 7 is a is a top front right perspective view of the portable livestock corral of FIG. 5 after setup of the bud box assembly in the left one of the livestock pens.

FIGS. 1 through 4 show the portable livestock corral 10 in a transport mode, where a pair of removable transport wheels 46 are respectively mounted to the opposing sides 12C, 12D of the frame 12 near the rear end 12B thereof, to cooperate with a towing vehicle (not shown), when coupled to the gooseneck towing arrangement 38, to support frame 12 in an elevated state off the ground for rolling transport thereover. FIG. 7 onward instead show the portable livestock corral 10 in a deployed field mode with the transport wheels 46 removed, and the frame 12 seated atop the ground. For use in transitioning the portable livestock corral 10 between the transport and field modes, a set of hydraulic jacks are provided, which in the illustrated example is a set of three jacks, featuring a single front jack 48A located at the front end of the alley 22 in front of a mid-post of the end wall assembly 36, and a pair of rear jacks 48B respectively disposed at the opposing sides 12C, 12D of the frame at or near the rear end 12B thereof.

Figure 5:
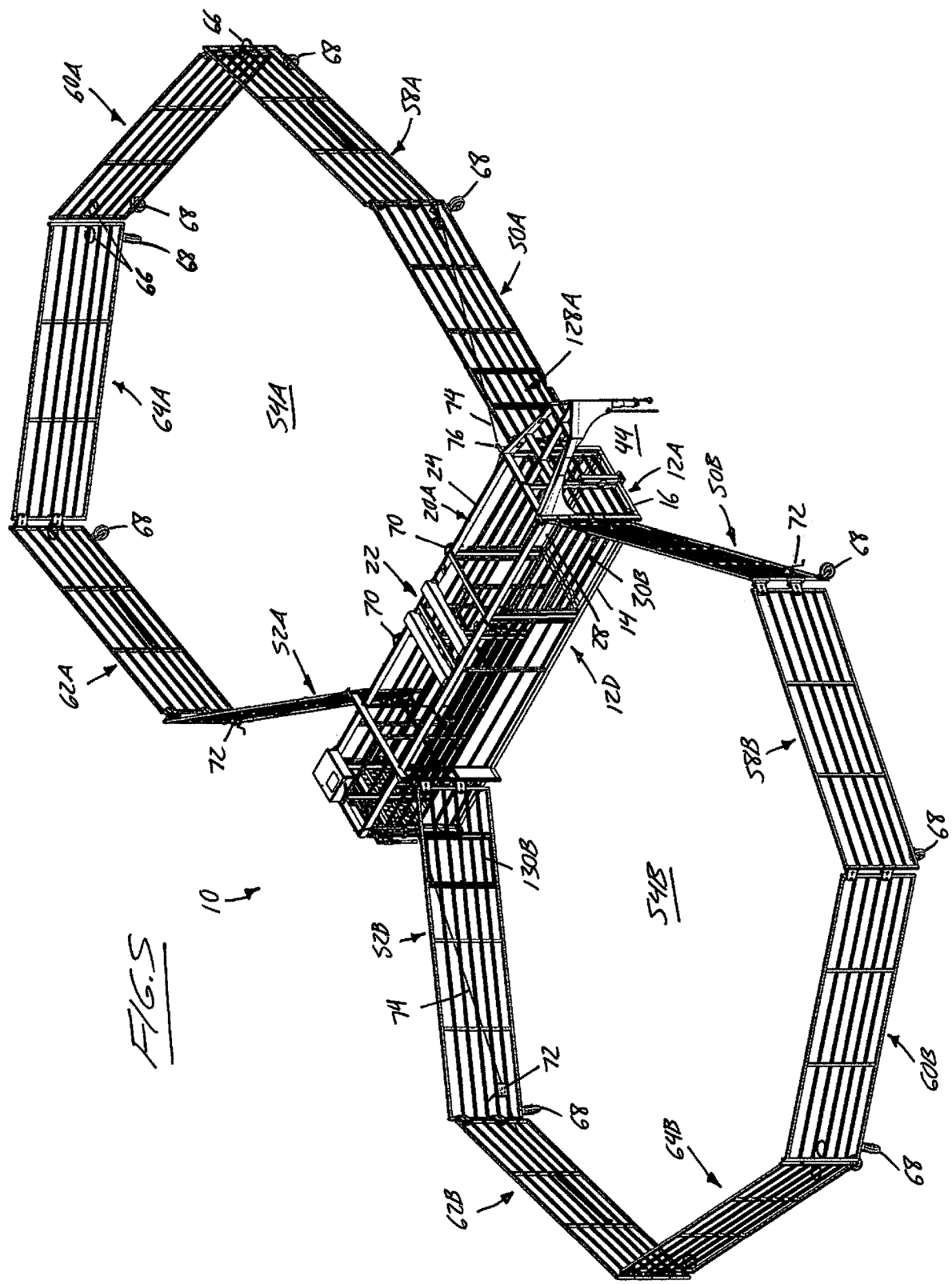
FIG. 5 is a top front right perspective view of the portable livestock corral in a deployed field mode defining two livestock pens on opposing sides of a central alleyway, prior to setup of a bud box assembly in one of the two livestock pens.
Figure 6:
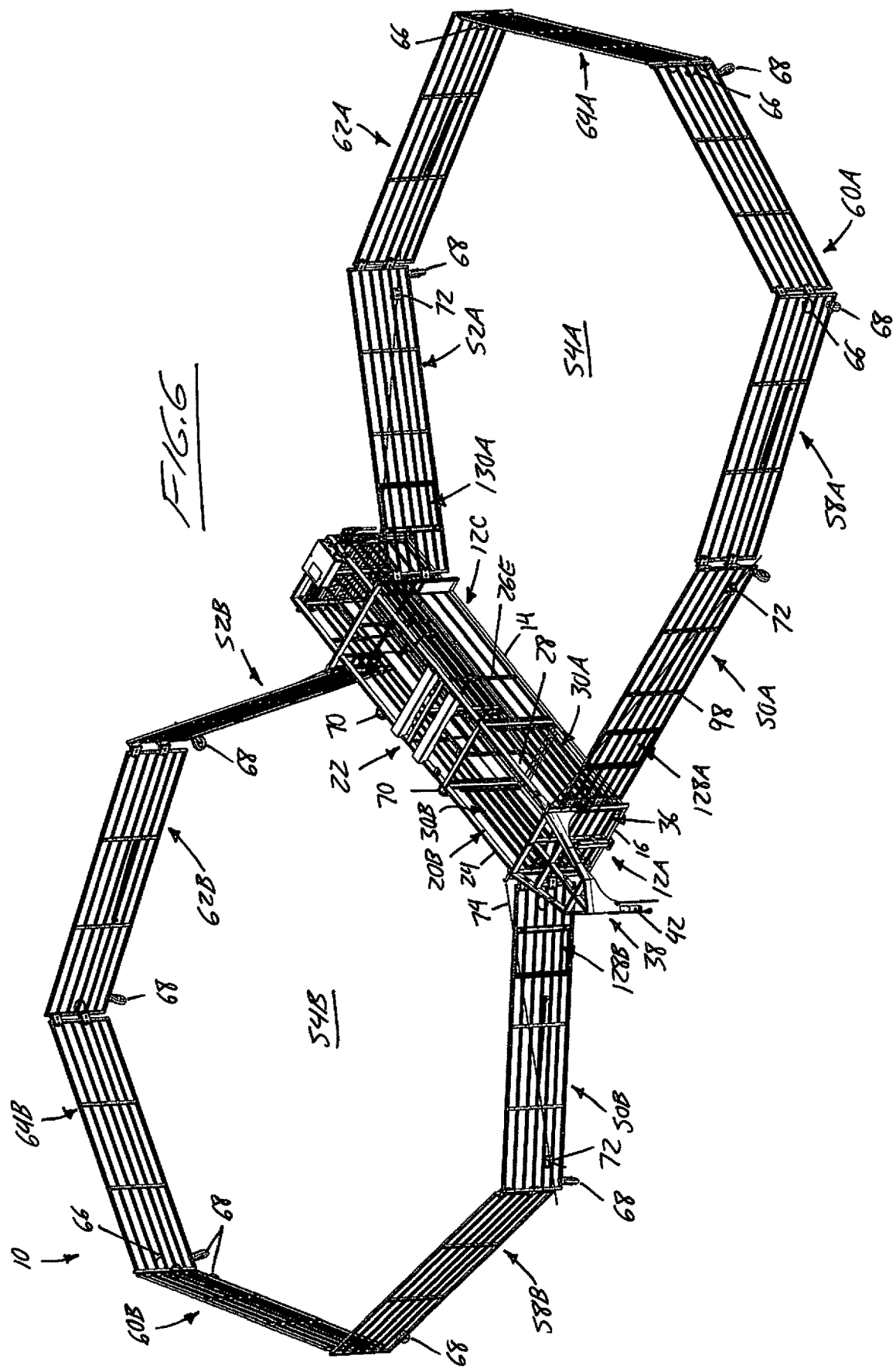
FIG. 6 is a top front left perspective view of the portable livestock corral of FIG. 5.

First and second sets of corral panels respectively reside on the opposing sides of the alleyway 22. In FIGS. 1 through 5, the corral panels of each set are shown in stowed transport positions folded up alongside the respective sidewall structure 20A, 20B at the respective side of the alleyway 22. In FIG. 5 onward, the corral panels of each set are shown in deployed working positions cooperating with the respective sidewall structure 20A, 20B to collectively delimit a respective livestock pen outside the alleyway 22 at an exterior of the respective sidewall structure 20A, 20B. When both sets of corral panels are so deployed, first and second livestock pens 54A, 54B thus reside across the alleyway 22 from one another, whereby the alleyway 22 denotes a central hub of the overall livestock corral 10 in this deployed field mode. In the illustrated example, each set of corral panels is composed of six such panels, though the quantity may vary. Each set includes a front corral panel 50A, 50B hinged to the alleyway 22 at or near the front end thereof, for example hinged to the respective outer post 36A, 36B of the end wall assembly 36, and a rearmost corral panel 52A, 52B hinged to the alleyway 22 at a location nearer to the rear end of the alleyway than to the opposing front end thereof. In the illustrated example, the rearmost corral panel 52A, 52B of each set is hinged at a location offset longitudinally further from the very rear end of the alleyway 22 than the front corral panels 50A, 50B are offset longitudinally from the opposing front end of the alleyway. This way, a rearmost sidewall section 56A, 56B of each sidewall of the alleyway resides outside the respective livestock pen 54A, 54B, and a human operator can stand alongside either of these rearmost sidewall sections 56A, 56B at a location that is outside the alleyway 22 and also outside both of the livestock pens 54A, 54B, thus denoting a safe location from which to operate a respective one of two slide gates 57A, 57B installed at the rear end of the alleyway 22, as described in more detail further below.

Each set of corral panels is composed of two subsets of corral panels, a front subset and a rear subset. The front subset of corral panels is composed of the front corral panel 50A, 50B and at least one neighbouring front-connected corral panel, of which there are two in the illustrated example. These two front-connected corral panel's include a mid-front panel 58A, 58B hinged to the front corral panel 50A, 50B at a distal end thereof opposite the front corral panel's hinged connection to the alleyway, and an end-front panel 60A, 60B hinged to the mid-front panel 58A, 58B at a distal end thereof opposite the mid-front panel's hinged connection to the front corral panel 50A, 50B. Likewise, the rear subset of corral panels is composed of the rear corral panel 52A, 52B and at least one neighbouring rear-connected corral panel, of which there are two in the illustrated example. These two rear-connected corral panels include a mid-rear panel 62A, 62B hinged to the rear corral panel 52A, 52B at a distal end thereof opposite the rear corral panel's hinged connection to the alleyway, and an end-rear panel 64A, 64B hinged to the mid-rear panel 62A, 62B at a distal end thereof opposite the mid-rear panel's hinged connection to the rear corral panel 52A, 52B. Each hinged connection among each set of corral panels has an upright hinge axis about which two adjacent corral panels can swing relative to one another, or about which a front or rear corral panel can swing relative to the respective sidewall structure of the alleyway 20. In their stowed transport positions, the front subset of corral panels fold up alongside one another in parallel relationship along the respective sidewall of the alleyway 22, and the rear subset of corral panels fold up alongside one another in parallel relationship alongside the folded-up front subset. In the deployed positions of each set of corral panels, the front-end and rear-end corral panels are secured together at the distal ends thereof opposite their hinged connections to the mid-front and mid-rear corral panels, for example with one or more securement chains 66.

Each corral panel has a respective ground wheel 68 on a bottom rail thereof near the distal end of the panel, for rolling support of the corral panel during movement thereof between the stowed and deployed positions. Each ground wheel 68 has its rotation axis lying parallel to the plane of the respective corral panel, so that the rolling direction of the ground wheel is perpendicular thereto, thus correlating to arcuate swinging movement of the distal end of the corral panel about the hinge axis of it's hinged proximal end. In each subset of corral panels, a respective securement chain 66 is provided for use at any point where a distal end of one panel folds up next to a proximal end of another, including at the distal ends of the end panels 60A, 60B, 64A, 64B where the same securement chain(s) referenced above to interconnect the two deployed subsets of corral panels can also be used to secure the end front panel 60A or end rear panel 60B to the respective mid front panel 62A or mid rear panel 62B, when stowed.

In folding up of the front subset of panels to the stowed transport position, the end-front panel 60A, 60B is folded up along an inner side of the mid-front panel 58A, 58B and chained or otherwise secured thereto, and the secured-together end-front and mid-front panels are folded up along the inner side of the front panel 50A, 50B, with the end-front panel 60A, 60B sandwiched between the front panel 50A, 50B and end-front panel 60A, 60B. The three secured-together panels of the front subset are then folded up against the sidewall of the alleyway 22 and secured thereto, thereby establishing the stowed transport positions of the front subset, where the end-front panels 60A, 60B and mid-front panels 58A, 58B are sandwiched between the alleyway sidewalls and the front panels 50A, 50B. The same folding pattern is followed among the corral panels of the rear subset, except that once the three panels of the rear subset are folded and secured together, the three panels are folded up against the already stowed front subset, instead of directly against the alleyway sidewall. Once both subsets are fully folded into their stowed transport positions alongside the alleyway sidewall, they are secured thereto using a pair of tie-down straps 70 that are anchored to the top headers 24 and bottom frame beams 14 in positions spanning across the outermost one of the folded up corral panels (the rear corral panel 52A, 52B, in the illustrated example), and then tensioned to hold the full set of folded corral panels in place against the sidewall of the alleyway 22.

To make each folded subset of corral panels easier to roll into and out of their stowed positions, each subset of corral panels features an assistive mechanism for the purpose of reducing the effective rolling weight of the panel subset. The assistive mechanism is composed of a winch 72 mounted to the front or rear panel 50A, 50B, 52A, 52B of the respective subset near the lower distal corner thereof, and a suspension cable 74 running from the winch 72 to a elevated anchor point 76 near the hinged connection of the respective front or rear panel to the alleyway 22, for example at the top of the respective post to which that frontmost or rearmost panel is hinged. Actuation of the winch 72 in a winding direction acting to tension the suspension cable 74 thus exerts a lifting force on the front or rear corral panel 50A, 50B, 52A, 52B near the distal end thereof, thus reducing the effective weight exerted by the folded panel subset on the ground wheel 68 of the front or rear corral panel. In the illustrated example, where the rear subset of corral panels are the outermost one of the two subsets when folded up in their stowed transport positions, the rear corral panels 52A, 52B are hinged to a pair of offset support posts 78A, 78B that are offset further outwardly from their respectively neighbouring sidewall structures 20A, 20B of the alleyway 22 than the posts 26A, 26B to which the front subset of corral panels are hinged.

To enable improved livestock flow into the alleyway 22 from either livestock pen 54A, 54B, the portable corral 10 includes a set of bud box panels, which in the illustrated example is composed of a gated first bud box panel 80 and a non-gated second bud box panel 82. The bud box panels 80, 82 are installable at a front alleyway-adjacent corner of either livestock pen 54A, 54B to form an enclosed bud box 84 next to the frontmost alley section 22A. The drawings show assembly of the bud box 84 at the front alleyway-adjacent corner of the first livestock pen 54A for use of the bud box in routing of livestock into the alleyway 22 from the second livestock pen 54B. From the following description, it will be appreciated that the same two bud box panels 80, 82 may alternatively be installed at the front alleyway-adjacent corner of the second livestock pen 54B for use in routing of livestock into the alleyway 22 from the first livestock pen 54A. Also, since bud box panel 80 is gated, opening of this panel's gate allows livestock to be routed from one pen to the other without, when combined with opening of the two side-gates 30A, 30B of the alleyway. Routing of livestock into the alleyway 22 directly from the livestock pen 54A in which the bud box 84 is setup may be possible with the gate of bud box panel 80 and the nearest alleyway side-gate 30A both open, but the opposing alleyway side-gate 30B closed, though this loading procedure would lack the benefit of a bud box at the opposing side of the alleyway.

The bud box panels 80, 82 are installed into their assembled state by pinned connection of a proximal end of the gated bud box panel 80 to the frontmost corral panel 50A at an intermediate location therealong between the proximal and distal ends thereof, pinned connection of a proximal end the non-gated bud box panel 82 to the sidewall structure 20A of the alleyway at the side-gate frame post 26C, and pinned connection of the two bud box panels 80, 82 together at distal ends thereof opposite their pinned connections to the frontmost corral panel 50A and alleyway sidewall structure 20A. FIG. 10 shows the bud box panels 80, 82 in isolation. The gated bud box panel has a gate frame composed of a proximal stanchion 86 that defines the panel's proximal end, a bottom rail 88 from which the proximal station 86 stands upright at a proximal end of the rail 88, and a distal stanchion 90 that stands upright from the opposing distal end of the bottom rail 88 and defines the distal end of the panel 80. An openable/closable bud box gate 92 is embodied by the gated panel 80. The bud box gate 92 is hinged to the distal stanchion 90 to enable swinging movement of the gate 92 about an upright hinge axis between the closed position shown in the drawings, where the gate 92 obstructs the gate space between the two stanchions of the gate frame, and an unillustrated open position of non-obstructing or lesser obstructing relation to the gate space to enable traversal of livestock or human operators therethrough. A latch 32A at the swingable free end of the gate 92 is provided for latched connection to a latch catch 34A on the proximal stanchion 86 in the closed position of the gate 92.

The proximal stanchion 86, at an outer side thereof facing away from the gate space, features one or more upper pin lugs 94 near a top end of the stanchion and lower pin lugs 96 near a bottom end thereof. For pinned coupling of the proximal stanchion 86 to the frontmost corral panel 50A, an upright mid-post 98 of the frontmost corral panel 50A features upper and lowering mounting slots 100, 102 (FIG. 11) at spaced elevations therein. These upper and lower mounting slots 100, 102 can selectively receive an upper pin bracket 104 and lower pin bracket 106 (FIG. 10), respectively. These upper and lower pin brackets 104, 106, when installed on the front corral panel 50A, are alignable with the upper and lower pin lugs 94, 96 of the gated bud box panel 80, such that an upper pin 108 is receivable through the aligned upper pin lug(s) 94 and upper hinge bracket 104, and a lower pin 110 is receivable through the aligned lower pin lug(s) 96 and lower hinge bracket 106, thereby establishing pinned connection of the gated bud box panel 80 to the frontmost corral panel 50A.

Like the proximal stanchion 86 of the gated bud box panel 80, a proximal post 112 of the non-gated bud box panel 82 at the proximal end thereof has upper and lower pin lugs 114, 116 at its outer side thereof that faces away from an opposing distal post 118 of the panel 82. During installation of the bud box panels 80, 82, the pin lugs 114, 116 of panel 82 are alignable with upper and lower pin brackets 120, 122 (FIG. 12) on the side-gate frame post 26C, for example at a rear side thereof facing away from the frontmost sidewall area 28 and the front frame post 26A. This way, an upper pin 108A is receivable through the aligned upper pin lug(s) 114 and upper pin bracket 120, and a lower pin 110A is receivable through the aligned lower pin lug(s) 116 and lower pin bracket 122, thereby establishing pinned connection of the non-gated bud box panel 82 to the sidewall structure 20A of the alleyway 22. The distal stanchion 90 of the gated bud box panel 80 and distal post 118 of the non-gated bud box panel 82 likewise have respective alignable sets of upper and lower pin lugs 124, 126 thereon at outer sides thereof for cooperative receipt of upper and lower pins 108B, 110B to pin the two bud box panels 80, 82 together, thereby completing assembly and installation of the bud box 84.

The frontmost corral panel 50A, 50B of each set of corral panels, at a region of the front panel residing between its hinged connection to the alleyway 22 and the mid-post 98 at which the gated bud box panel 80 is connectable, features an openable closable man gate 128A, 128B therein. When the bud box 84 is installed in either livestock pen 54A, 54B, the man gate 128 enables human access into the bud box 84 from the surrounding environment outside the alleyway 22, livestock pens 54A, 54B and bud box 84. In absence of the bud box 84, the same man gate 128A, 128B can be used to access the livestock pen 54A, 54B from the surrounding environment outside the alleyway 22 and the livestock pens 54A, 54B. Since both livestock pens 54A, 54B have such a man gate 128A, 128B at the front corral panel 50A, 50B, human operators may traverse from one livestock pen to the other, without traversing through the alleyway 22, by departing one livestock pen through its man gate 128A, 128B traversing the walkthrough area 44 beneath the overhang structure 40 of the gooseneck towing arrangement 38, and entering the other livestock pen through its man gate.

These man gates 128A, 128B in the front corral panels 50A, 50B may be referred to as front man gates given their location at the front of the livestock pens 54A, 54B, and a similar set of rear man gates 130A, 130B are likewise provided in the rear corral panels 52A, 52B of the two corral panel sets to provide similar entrance/exit ability at a rear area of each livestock pen, in close proximity to the rearmost sidewall sections 56A, 56B of the alleyway 22, from outside of which the two slide gates 57A, 57B at the rear end of the alleyway 22 are operable, for example via respective manual actuation handles 132A, 132B of the slide gates 57A, 57B that are situated just outside the rearmost sidewall sections 56A, 56B of the alleyway 22 at the rear ends thereof. The front and rear man gates are single-swing gates that open in only one direction, specifically opening into the livestock pens when opened, and are spring-biased into their closed positions. Accordingly, none of the man gates can be pushed open by livestock from inside a pen 54A, 54B or bud box 84, but are human-openable from both the inside and outside, will self-close under spring-loaded action absent any operator-exerted opening force.

FIGS. 7 and 8 show the portable corral 10 in a general field mode with the bud box panels 80, 82 installed in the first livestock pen 54A to divide and enclose the front alleyway-adjacent corner thereof as a bud box 84 that is isolated from a remainder of the first livestock pen as a bud box. FIG. 13 shows the same portable corral 10 and installed bud box 84 in a more specific working mode where the two side-gates 30A, 30B at the frontmost alleyway section have been opened into their respective outswung positions, enabling use of the bud box 84 to route livestock into the alleyway 22 from the second livestock pen 54B. The outswung open position of side-gate 30A reaches into the bud box 84 along the inside of the non-gated bud box panel 82, while the outswung open position of side-gate 30B reaches into the second livestock pen 54B. The frontmost sidewall areas 28 of both side wall structures 20A, 20B are thus open, and a human operator in the second livestock pen 54B can encourage a small group of livestock from the second livestock pen 54B through the open side-gate 30B into frontmost alleyway section 22A that opens into the bud box 84 at the opposing side of the alleyway 22. The human operator in the second livestock pen then closes the side-gate 30B behind the admitted livestock. Any of the admitted livestock who did not immediately travel rearwardly through the alleyway 22, and instead traversed across the frontmost alleyway section 22A into the bud box 84, will reach the closed end thereof denoted by the closed bud box gate 92 of the gated bud box panel 80, and will thereafter turn around (per their natural inclination to return to where they came from), only to find the side-gate 30B now closed. The livestock therefore have no option but to traverse longitudinally rearward through the alleyway 22 toward the rear end thereof, where, for example, a livestock trailer (not shown) may be waiting outside the rear slide gates 57A, 57B for loading of the livestock trailer via the alleyway. Should any straggling livestock fail to advance rearwardly through the alleyway 22, the same or a different human operator can enter the bud box 84 via the man gate 128A to encourage the straggler(s) into and through the alleyway 22.

Figure 2:
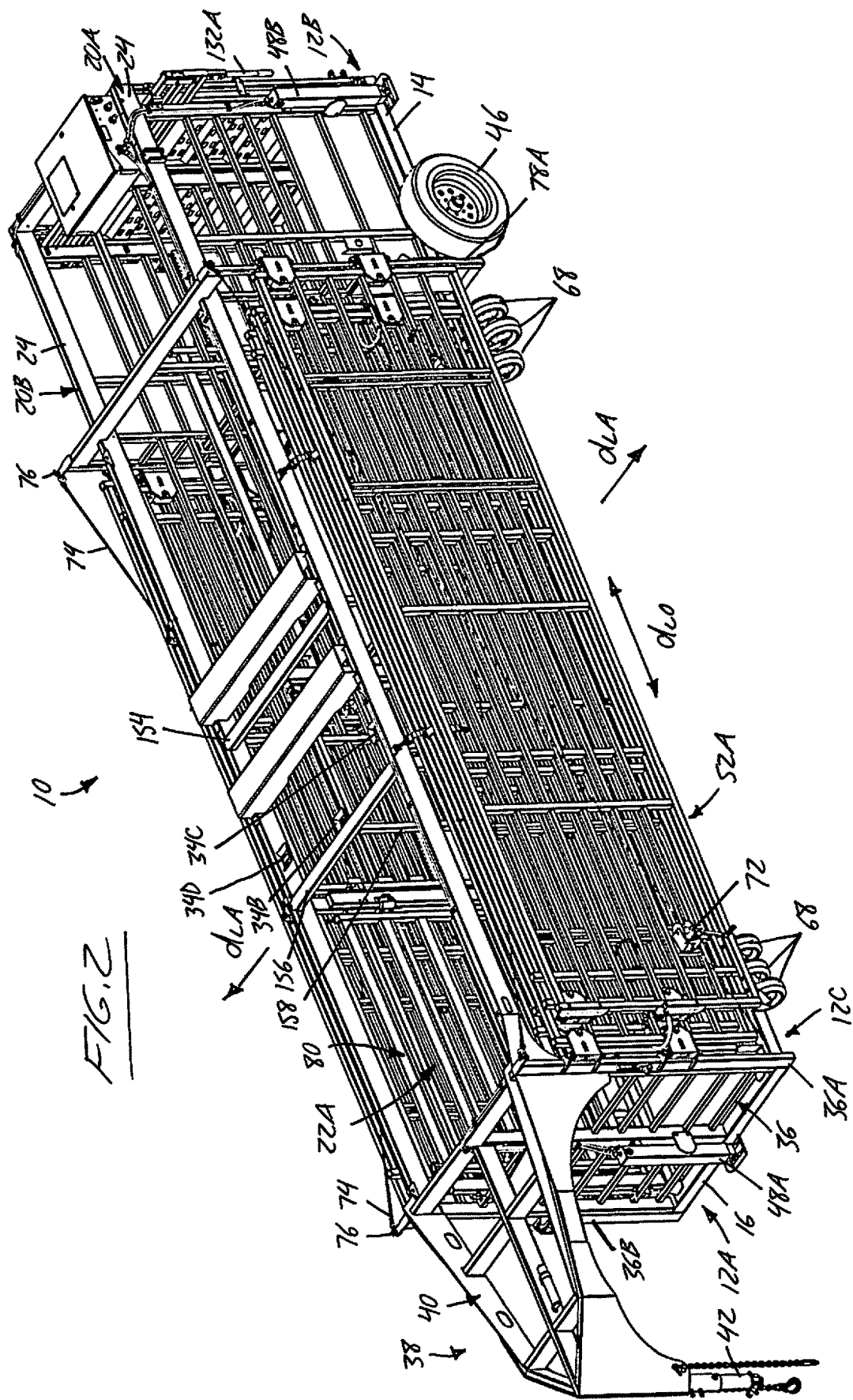
FIG. 2 is a top front left perspective view of the portable livestock corral of FIG. 1.
Figure 3:
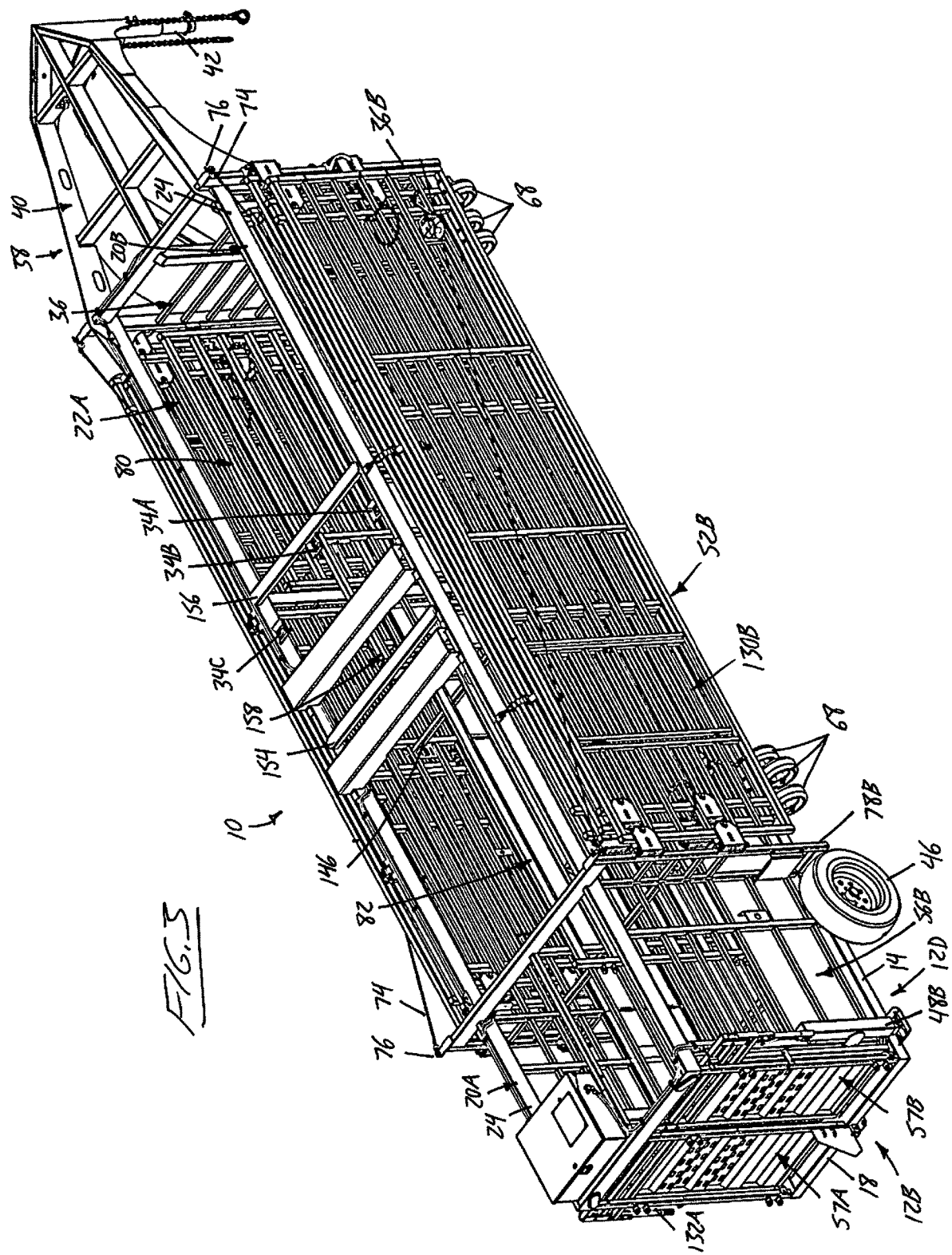
FIG. 3 is a top rear right perspective view of the portable livestock corral of FIG. 1.
Figure 4:
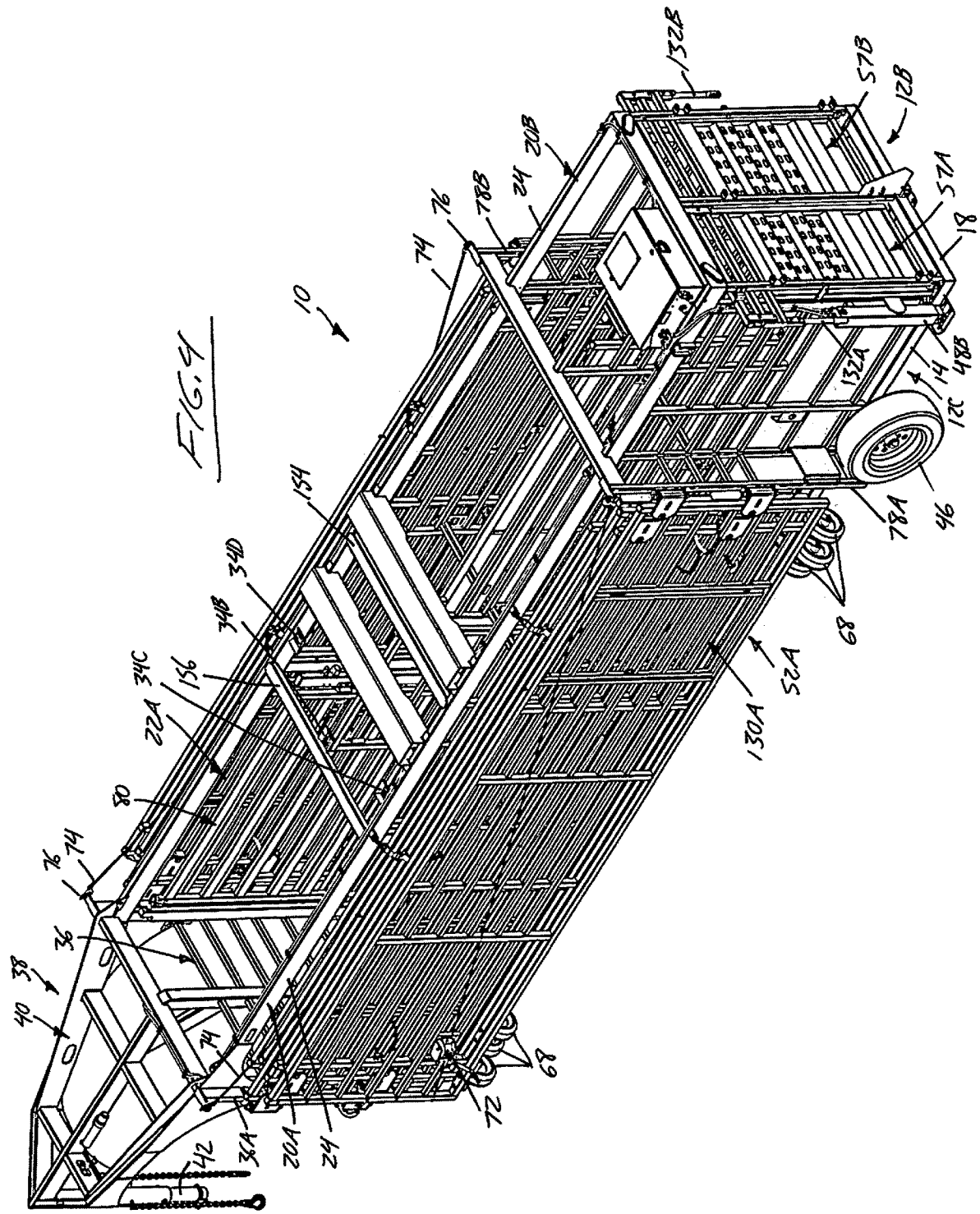
FIG. 4 is a top rear left perspective view of the portable livestock corral of FIG. 1.

At any time, for example after full unloading of the second livestock pen 54B, the same bud box panels 80, 82 can be uninstalled from the first livestock pen 54A and installed in the second livestock pen, where the bud box is then used in the same fashion to unload livestock from the first livestock pen 54A. When transitioning the portable corral from field mode to transport mode, the bud box panels 80, 82 are decoupled from the foldable corral panels and the alleyway 22, and can be stowed inside the alleyway 22. FIG. 2 shows the gated bud box panel 80 stowed inside the frontmost alleyway section 22A alongside one of the side-gates 30B thereof, which resides in its closed and latched state. To secure the stowed bud box panel 80 in place, the upper and lower pin lugs 94, 96, 124, 126 on one of its stanchions 86, 90 can be used for making pinned connections of this end of the bud box panel 80 to respective upper and lower cross-bars of the end wall assembly 36 at the alleyway's front end. This can be seen in FIG. 16, where upper pin lug(s) 124 of bud box panel 80 is/are aligned with a vertical pin bore in an uppermost cross-bar 138 of the end wall assembly 36 for pinned connection thereto, and lower pin lug(s) 126 of bud box panel 80 is/are likewise aligned with a vertical pin bore in a second-lowermost cross-bar 139 of the end wall assembly 36 for pinned connection thereto. Additional tying or strapping can be employed to further secure the stowed gate panel 80 in place alongside the closed alleyway side-gate 30B, nearer to the opposing end of the stowed bud box panel 80 situated further back in the alleyway.

In the illustrated example, the non-gated bud box panel 82 is instead stowed in place alongside a central divider wall 140 of the alleyway that longitudinally divides the alleyway interior into two neighbouring alleys 142A, 142B over a partial fraction of the alley's overall length. The stowed bud box panel 82 may be tied or strapped to the divider wall 140. Like the robustly secured stowage of the first bud box panel 80, where the tied or strapped securement thereof is accompanied by a pinned mechanical coupling to metal cross-bars of the front end wall assembly 36, the second bud flow panel 82 may be mechanically constrained by a pair of removable cross-bars 144, 146, each slid through a pair of bar holders provided in opposing sidewall sections of the alleyway 22 and pinned in place in a position spanning laterally across the interior of the alleyway in positions penetrating open areas of the stowed bud flow panel 82 between adjacent cross-bars thereof. Bar holder 148A of the first sidewall structure can be seen in FIG. 9, of which there is a second matching bar holder on the second sidewall structure (unlabelled). As also seen in FIG. 9, a third bar holder 148B for each such removable cross-bar 144, 146 may also be provided in the central divider wall 140 of the alley to accept passage of the removable cross-bar 144, 146. Each removable cross-bar 144, 146 penetrates the stowed bud box gate 82 at a location near, but inward from, a respective one of the panel's end posts 112, 118, whereby the two removable cross-bars 144, 146 not only prevent falling of the stowed bud box panel 82 to the ground through open areas of the alleyway frame 12 should the tied/strapped securement fail or loosen, but the bars 144, 146 also limit or prevent possible longitudinal sliding/shifting of the stowed bud box panel 82. In practice, during transition of the portable corral from the transport mode to the field mode, the cross-bars 144, 146 and the bud box panels 80, 82 are removed from the interior of the alleyway 22, though in the drawings the cross-bars 144, 146 are shown in their transport positions throughout the drawings, even in field mode, since their positions can be seen more clearly in the less obstructive field mode views of FIGS. 14 and 15, for example, compared to the transport mode views of FIGS. 1 through 4, where the folded-up corral panels notably reduce visibility of the alleyway interior.

The central divider wall 140 of the alleyway is a fixed wall of stationary position midway between and parallel to the two sidewall structures 20A, 20B of the alleyway, whereby the divided portion of the alleyway 22 is divided into two neighbouring alleys of equal size to one another. The divider wall 140 spans longitudinally forward from the rear end of the alleyway 22, where each of the two aforementioned slide gates 157A, 158B denotes an openable/closable rear end of a respective one of the two alleys 142A, 142B. The divider wall 140 spans toward the front end of the alleyway, but stops well short thereof, and more specifically, stops short of a plane occupied by the two side-gate frame posts 26C, 26D at the rear end of the frontmost alleyway section 22A and its openable/closable sidewall areas 28 where the side-gates 30A, 30B reside. A front end post 150 of the divider wall 140, visible in FIG. 9, denotes a terminal front end of the divider wall 140 at a location nearer to the frontmost alleyway section 22A than to the rear end of the alleyway where the slide gates 157A, 157B reside. In the illustrated example, this front end post 150 of the divider wall 140 resides in the same plane as two frame posts 26E, 26F of the sidewall structures 20A, 20B whose respective nearest forwardly-neighbouring frame posts are the side-gate frame posts 26C, 26D. Front end post 150 spans upright between a central longitudinal beam 152 (FIGS. 14-15) of the frame 12 and an overhead cross-beam 154 that spans between the headers 24 of the sidewall structures 20A, 20B at a top end of the front end post 150. Another such overhead cross-beam 156 spans between the headers 24 of the sidewall structures 20A, 20B above the side-gate frame posts 26C, 26D at the rear end of the frontmost section 22A of the alleyway.

The section of the alleyway spanning from the pair of side-gate frame posts 26C, 26D to the rearwardly neighbouring pair of frame posts 26E, 26F is referred to herein as a swing section of the alleyway, as it contains an internal swing gate 158 (FIGS. 14-15) of the alleyway that resides in neighbouring and swingable relation to the central divider wall 140 at the front end thereof. A rear end of this internal swing gate 158 neighbours the front post 150 of the divider wall 140 and is embodied by an upright pivot post 160, whose top end is rotatably received by an upper pivot mount 162 that is forwardly cantilevered from the front end post 150 of the divider wall, and whose bottom end is rotatably received by a lower pivot mount installed atop the central longitudinal beam 152 of the alleyway's bottom frame 12. As a result, the internal swing gate is 158 is swingable about an upright pivot axis shared by the swing gate's rear post 160 and associated pivot mounts. A front end of the internal swing gate 158 is embodied by an upright latch post 164 that is connected to the pivot post 160 by a series of vertically spaced cross-bars. This latch post 164 carries a latch 32B (FIG. 9) at its top end that is extendable upwardly and retractable downwardly at the top of the internal swing gate 158.

A set of three swing gate latch catches 34B, 34C, 34D are provided for selective engagement thereof by the latch 32B in three different lockable positions of the internal swing gate 158. A first of these swing gate latch catches 34B is mounted to the overhead cross-beam 156 at the rear end of the frontmost alleyway section 22A, which coincides with the front end of the swing section of the alleyway. This first swing gate latch catch 34B is engageable by the swing gate latch 32B in a central, fully-open position thereof, in which the internal swing gate 158 resides in-line with the alleyway divider wall 140 at the front end thereof, thus forming a parallel, in-line extension of the divider wall 140 (as can be seen in FIG. 1). In field mode, with this internal swing gate 158 in its fully-open state, the two neighbouring alleys 142A, 142B on opposing sides of the divider wall 140 are both fully open at the front ends thereof, whereby livestock entering the alleyway 22 via either side-gate 30A, 30B thereof can enter both of the two neighbouring alleys 142A, 142B through the swing section and travel onwardly therethrough to the slide gates 157A, 157B at the respective rear ends of the neighbouring alleys 142A, 142B.

The second and third swing gate latch catches 34C, 34D are respectively mounted to the headers 24 of the two sidewall structures 20A, 20B of the alleyway, whereby each of these latch catches 34C, 34D is engageable by the swing gate latch 32B in a respective one of two single-alley closing positions that each closes off the front end of respective alley that is bound by the particular sidewall structure 20A, 20B to which the swing gate is latched, while leaving the front end of the other alley open. So, with reference to FIG. 15, the swing gate latch catch 34C mounted on the first sidewall structure 20A is engageable by the internal swing gate latch 32B in a first single-alley closing position that closes off the front end of the first alley 142A that is bound between that first sidewall structure 20A and the central divider wall 140, while leaving the front end of the second alley 142B fully open. With reference to FIG. 14, the swing gate latch catch 34D mounted on the second sidewall structure 20B is engageable by the internal swing gate latch 32B in a second single-alley closing position that closes off the front end of the second alley 142B that is bound between that second sidewall structure 20B and the central divider wall 140, while leaving the front end of the first alley 142A fully open.

Via user selection from among these three different lockable positions of the internal swing gate 158, a human operator can choose whether use the portable corral in a dual-alley mode routing livestock through both alleys 142A, 142B, or in either one of two possible single-alley modes, each having only a singular one of the two alleys open to livestock flow, while the other alley is closed off to such livestock flow. In either single-alley mode, the closed off one of the two alleys 142A, 142B can serve as an internal livestock-free zone of the portable corral, that is situated inside the overall alleyway 22, yet is inaccessible to the livestock, being closed by the internal swing gate 158 at the front end and by the respective alley-specific slide gate 157A, 157B at the other. A human operator can enter this livestock-free zone through momentary opening of the internal swing gate, followed by reclosure and latching of the internal swing gate 158 behind the operator, whereupon the human operator now safely occupies the closed off alley in a manner partially shielded by the divider wall 140 from livestock in the neighbouring alley, yet with visual, audible and physical access to the livestock in that neighbouring alley via openings in the skeletal divider wall 140 that is composed of a framework of metal tubing or other skeletal framing. Alternatively, with the swing gate already closed at the front end of the alley, a human operator can enter the livestock-free zone via the respective slide gate 157A, 157B at the rear end of the livestock-free zone.

It will be appreciated that in the illustrated example, the central divider wall 140 is of skeletal form over a full elevation thereof, though the divider wall 140 may alternatively be cladded over a lower fraction of its overall height for improved protection to the occupant of the livestock-free zone in the neighbouring closed-off alley during single-alley operations. Selective closure of either alley 142A, 142B via a locked closure position of the internal swing-gate 158 is not only useful to create a livestock-free zone inside the alleyway for a human operator, but can also be used to close off the alley behind a group of livestock admitted thereto to prevent attempted backing-out of the livestock from the alley.

As best shown by the example of one of the two identical alleyway side-gates in FIG. 17, each alleyway side-gate 30A, 30B has as a vertically displaceable ground stake 170 that depends downward from an open bottom end of an upright hollow end post 172 of the side-gate 30A, 30B at the swingable free end thereof. The ground stake 170 is vertically displaceable between a default retracted position substantially retracted into the interior of the hollow end post 172 and disengaged from the ground, and an extended position of more downwardly protracted relation from the bottom of the end post 172 so that a pointed bottom end 170A of the ground stake 170 penetrates into the ground to hold 30A, 30B the gate stationary in either of its open positions. An operator handle 174, attached to an upper/internal portion of the stake 170 that remains inside the end post 172 regardless of the stake position, projects laterally from the stake through a control slot 176 in a side of the end post 172. The control slot 176 has a main longitudinal run 176A lying longitudinally of the end post 172 to accommodate displacement of the stake 170 down into and back up from its extended position, and an upper branch 176B that juts laterally from the top end of the main run 176B and then then turns downwardly therefrom a short distance to a terminal holding end of the slot 176. The handle 174 normally occupies this terminal holding end of the slot at the upper branch thereof, under a downward gravitational bias of the stake 170 that keeps the handle 174 in the downturned upper branch 176B.

When extension of the stake 170 is needed to hold the gate 30A, 30B open, the handle 174 is lifted slightly from its default position at the terminal holding end of the upper branch 176B of the slot 176, and slid laterally over to the main longitudinal run 176A, where the stake 170 is allowed to gravitationally fall from the end post 172 down to ground level. Outside the bottom end of the end post 172, a footplate 178 projects laterally out from the stake 170, whereby the operator can step on the footplate 178 and apply downforce thereto to penetrate the pointed bottom end 170A of the stake 170 further into the ground to firmly anchor the gate 30A, 30B in place. When reclosure of the side-gate 30A, 30B is warranted, the ground spike 170 is lifted from this ground penetrating state back up into its default retracted state by the lifting the handle 174 up the main run 176A of the control slot 176, then shifting the handle 174 laterally into the holding branch 176B of the control slot 176, where release of the handle allows its to settle into the downturned terminal holding end of the control slot 176.

Figure 18:
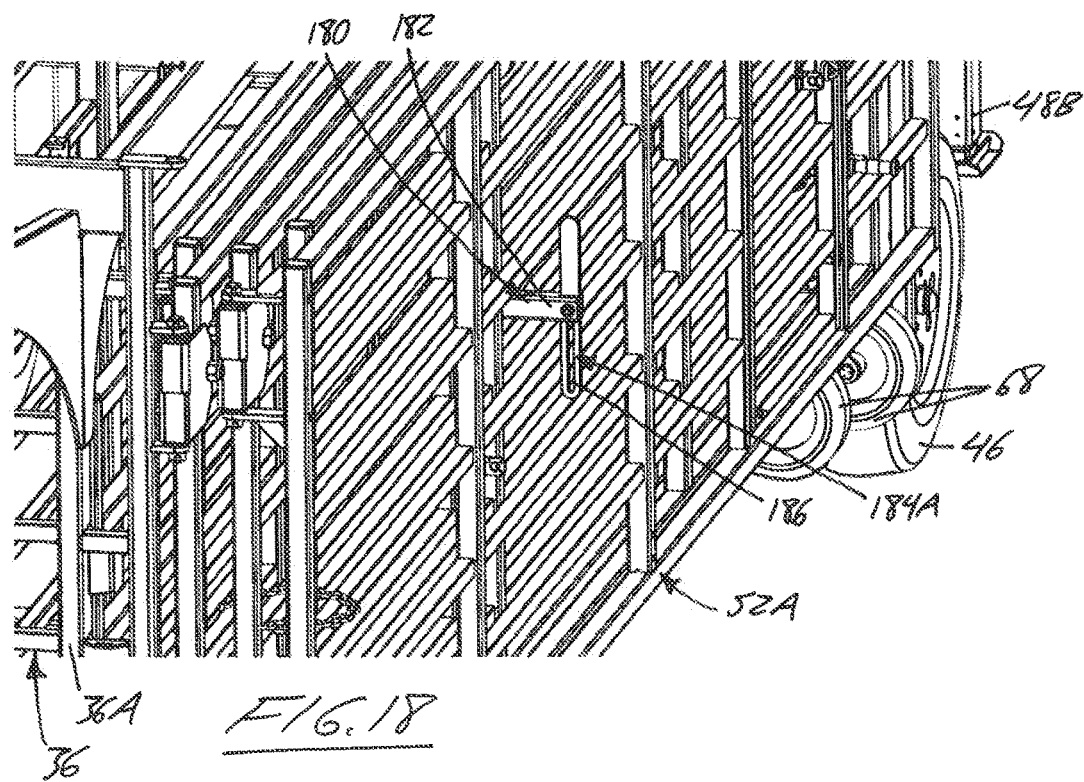
FIG. 18 is a partial top front left perspective view of the portable livestock corral of FIG. 1 with a transport safety bar installed thereon to mechanically restrain folded-up corral panels at opposing sides of the alleyway.
Figure 19:
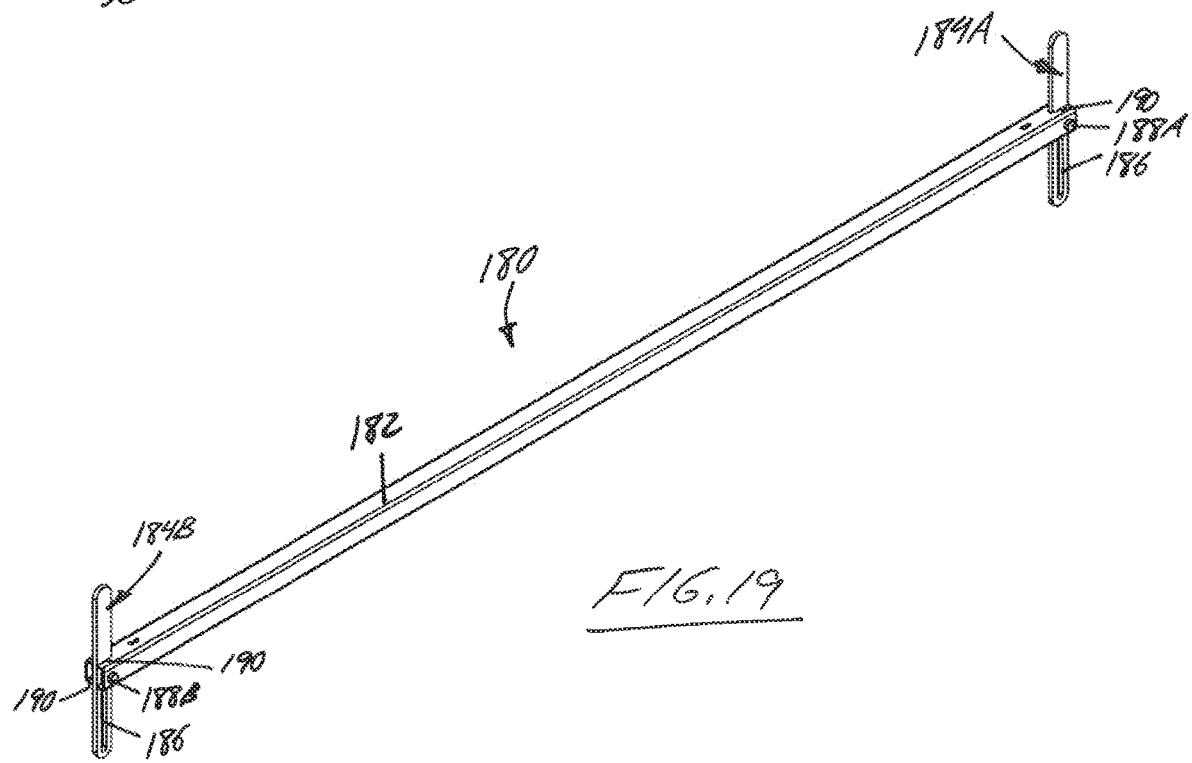
FIG. 19 is an isolated perspective view of the transport safety bar of FIG. 18, being composed of a main tube and two slotted stopping members at opposing ends thereof.

As described above, the folded-up corral panels may be secured in their stowed positions for transport by tie-down straps 70. FIG. 18 illustrates further mechanical securement of the folded-up corral panels at the opposing sides of the alleyway through use of a safety bar 180. The safety bar 180 is composed of a main tube 182 of rectangular (optionally square) cross section, and two slotted stop members 184A, 184B each pivotably pinned to the main tube 182 near a respective one of the main tube's two opposing ends. As illustrated, each stop member 184A, 184B may be composed of a relatively flat and elongated metal bar, preferably with rounded ends to avoid sharp corners that may otherwise carry greater potential for injury during manual manipulation of the stop members. The two identical stop members 184A, 184B each have a slot 186 running lengthwise thereof, but over only an approximate half-length thereof. Near each end of the main tube 182, a respective pivot pin 188A, 188B penetrates transversely through two opposing sidewalls of the tube 182, and in doing so, passes through the slot 186 of the respective stop member 184A, 184B. In the opposing top and bottom walls of the tube 182, each end of the tube 182 has an aligned pair of open-ended slots 190 running a relatively a short distance longitudinally of the tube.

FIGS. 18 to 20A show the slotted stop members 184A, 184B disposed in their respective stopping positions suitably oriented to both mechanically block both sets of folded-up corral panels of the portable corral 10 from swinging away from the sidewall structures 20A, 20B of the alleyway 22, and also block the safety bar 180 from sliding out of a working position penetrating through the folded-up corral panels, and through the alleyway sidewalls and alleyway divider wall 140. By contrast, FIG. 20D shows one of the stop members 184B in a retracted release position enabling withdrawal of the safety bar 180 from this working position to allow transition of the portable corral from transport mode to field mode. In the illustrated example, both stop members 184A, 184B are movable between these two positions, whereby the positions of stop member 184B shown in FIGS. 20A to 20D are also attainable by identical stop member 184B at the opposing end of the safety bar 180. This way, the safety bar can be inserted into its working position either end first, and once inserted, can be withdrawn in either direction from either side of the alley 22, though this need not necessarily the case in other embodiments.

In the stopping position of each stop member 184A, 184B (FIGS. 18-20A), the stop member lies in a vertical orientation lying perpendicularly transverse to the horizontal main tube 182, with the respective pivot pin 188A, 188B penetrating the slot 186 at the top end thereof, whereby the slotted and unslotted halves of the stop member hang downward and stand upward from the main tube 182, respectively. In this stopping position, an inner side of each stop member (the side thereof facing toward the opposing end of the main tube), is abutted or closely neighboured by the closed ends of the open-ended slots in the top and bottom walls of the main tube 182, which block any possible pivoting of the stop member 184A, 184B about the respective pivot pin 188A, 188B.

In the working position of the safety bar 180, the main tube 182 passes horizontally through the vertical openings left between adjacent cross-bars of the folded-up corral panels, alleyway sidewalls and alleyway divider wall (collectively, "the alleyway walls"), and the vertical height of the stop member's vertically-transverse relation to main tube 182 exceeds the vertical height between adjacent cross-bars of the corral panels and alleyway walls. In the safety bar's working position, the two stop members 184A, 184B each resides just outside the outermost corral panel 52A, 52B of the respective set of folded-up corral panels at the respective side of the alleyway, and so the vertical orientation and height of each vertically oriented stop member 184A, 184B mechanically blocks any outward swinging of the respective set of folded-up corral panels, should the preferably strapped securement thereof by the tie-down straps 70 fail during transport.

Figure 20A:
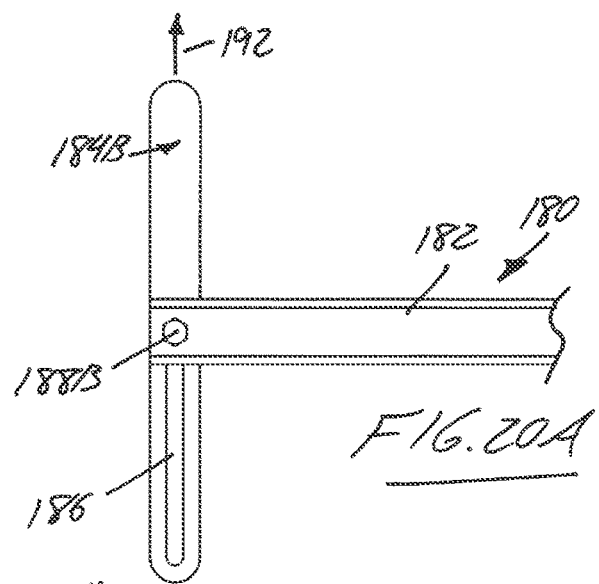
FIG. 20A is a partial side elevational view of the transport safety bar of FIG. 19 at one end of the main tube, with the respective slotted stop member in a stopping position lying perpendicularly transverse of the main tube.
Figure 20B:
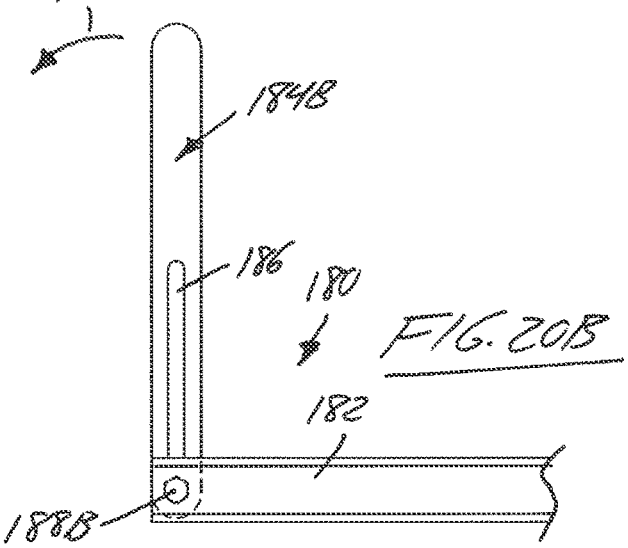
FIG. 20B is another partial side elevation view of the transport safety bar after initial lifting of the slotted stop member from its stopping position to a momentarily raised position.

Transition of stop member 184B from the stopping position to a retracted release position allowing insertion and extraction of the safety bar to and from its working position spanning laterally through the alleyway 20 is now described in relation to FIGS. 20A to 20B, with the same procedure being likewise followable for the other movable stop member 184A, illustration of which is therefore not duplicated. Starting with the stopping position of FIG. 20A, first the stop member 184B is manually lifted upward by the operator, as illustrated by arrow 192, thus raising its elevation relative to the main tube 182, until this lifting movement bottoms out under eventual contact of the respective pivot pin 188B with the closed bottom end of the stop member's slot 186, whereupon the substantial entirety of the stop member 184B now stands upward from the main tube 182, as shown in FIG. 20B. In this raised position, the bottom end of the upstanding stop member 184B now elevationally clears the slotted bottom wall of the main tube 182, whereby the top end of the upstanding stop member 184B is now pivotable by the operator downwardly and outwardly about the pivot pin 188A, as illustrated by arrow 194. This pivotal movement is continued, until the stop member 184B reaches a longitudinally extended position residing parallel to and in-line with the main tube 182 at the respective end thereof, as shown in FIG. 20C.

Figure 20C:
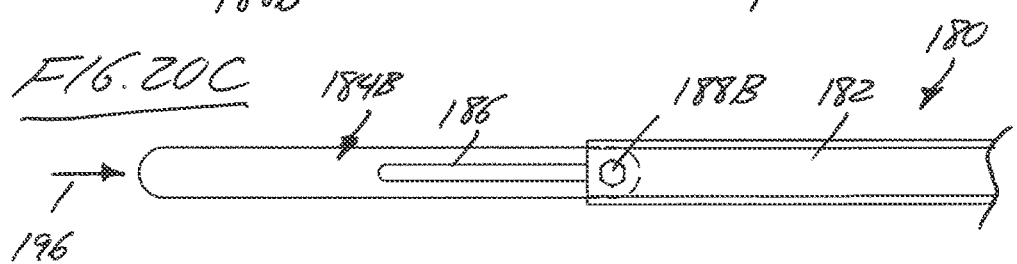
FIG. 20C is another partial side elevation view of the transport safety bar after pivoting of the slotted stop member from its raised position of FIG. 20B to a longitudinally extended position.
Figure 20D:
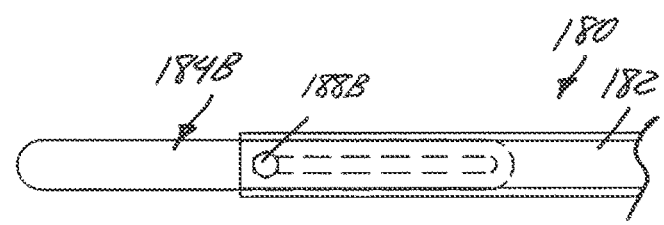
FIG. 20D is another partial side elevation view of the transport safety bar after sliding of the slotted stop member from the longitudinally extended position of FIG. 20C to a retracted release position further inside the main tube.

This parallel relationship of the stop member 184B to the main tube 182 allows insertion and withdrawal of the safety bar 180 through the openings of the folded-up corral panels and the alleyway walls, but in the longitudinally extended position of FIG. 20C, the stop member 184B will not self-retain its parallel relationship with the main tube. To accomplish such self-retained parallelism with the main tube, the stop member 184B is pushed longitudinally into the main tube 182 by the operator, as illustrated by arrow 196, until this longitudinal movement eventually bottoms out by contact of the pivot pin 188A with the end of the slot 186 nearest the midpoint of the stop member 184B, as shown in FIG. 20D. In this retracted release position, the slotted half of the stop member 184B is now housed inside the main tube 182, whose top and bottom wall thus block pivoting of the stop member 184B about the pivot pin 188A, and thereby maintain the substantially parallel relationship between the stop member 184B and the main tube 182. When both stop members have been repositioned into the parallel and self-retained release position of FIG. 20D, the safety bar 180 can be manually slid out of its working position from either side of the alleyway 22. In embodiments where only one stop member is movable between the stopping position of FIG. 20A and the retracted release position of FIG. 20D, removal of the safety bar 180 can only take place in one direction, by pulling of the safety bar 180 from the other end where the respective stop member is instead of fixed and immovable relation to the main tube 182.

When field use of the portable corral is completed, and transition of the portable corral back to transport mode is warranted, the safety bar 180 is reinserted into its working position spanning across the alleyway 22 to place the two stop members 184A, 1848 respectively outside the two sets of folded-up corral panels, whereupon the stop members 184A, 184B are returned to their stopping positions by performing a reversal of the FIG. 20A-20D procedure: first pulling the stop member 184B longitudinally outward from the internally retracted release position of FIG. 20D, then pivoting the stop member 184B upward from the longitudinally extended position of FIG. 20C, then lowering or dropping the stop member 184B from the fully raised upstanding position of FIG. 20B into the transversely crossing stopping position of FIG. 20A. This stopping position is self-retained by the pivotal obstruction cooperatively imparted by the stop member's inner side and the closed ends of the slots in the top and bottom walls of the main tube 182.

The insertion of the safety bar 180 is performed through a set of bar-holders on the alleyway walls of the same or similar type to those 148A, 148B referenced above for holding the cross-bars 144, 146. Each such bar-holder has a rectangular or square hole therein of only slightly greater size than the cross-sectional area of the respective bar, such that the inserted bar 144, 146, 180 cannot shift side to side or bounce up and down to any notable degree during transport.

Since various modifications can be made in my invention as herein above described, and many apparently widely different embodiments of same made, it is intended that all matter contained in the accompanying specification shall be interpreted as illustrative only and not in a limiting sense.

The invention claimed is:
1. A portable livestock corral comprising:
a towable frame of elongated character in a longitudinal direction, said towable frame having two ends of opposing relation to one another in said longitudinal direction, and first and second sides of opposing relation to one another in a lateral direction of transverse relation to said longitudinal direction;

first and second sidewall structures of erect relationship to said towable frame at the first and second sides thereof, respectively, and thereby respectively denoting first and second sides of a longitudinally oriented alleyway delimited between said first and second sidewall structures;

a first openable/closable wall section installed in the first sidewall structure, through which livestock are selectively admissible into the alleyway from the first side thereof;

a second openable/closable wall section installed in the second sidewall structure, through which livestock are selectively admissible into the alleyway from the second side thereof;

a collection of panels stowable in a manner carried by said towable frame for transport therewith, said collection of panels including:

a first set of corral panels that are arranged in one or more hinged-together groupings, within which adjacently paired corral panels are joined together by hinged connections, and are deployable externally of the alleyway outside the first sidewall structure thereof to cooperatively delimit a first livestock pen from which the livestock are admissible to the alleyway through said first openable/closable wall section;

a second set of corral panels deployable externally of the alleyway outside the second sidewall structure thereof to cooperatively delimit a second livestock pen residing across the alleyway from said first livestock pen, and from which the livestock are admissible to the alleyway through said second openable/closable wall section; and embodied separately of the first and second sets of corral panels, and configured for selectively attachable and detachable connection to one of the hinged-together groupings among the first set of corral panels, independently of said hinged connections between the adjacently paired panels thereof, a set of bud box panels deployable in a first working position outside the alleyway at the first side thereof in a position across from the second openable/closable wall section to create an enclosed bud box, inside the first livestock pen formed by the one or more hinged-together groupings of the first set of corral panels, for use routing of the livestock from the second livestock pen into the alleyway via the second openable/closable wall section.

2. The portable livestock corral of claim 1 wherein said same set of bud box panels is also selectively deployable in a second working position outside the alleyway at the second side thereof in a position across from the first openable/closable wall section for alternate use of the enclosed bud box during routing of the livestock from the first livestock pen into the alleyway via the first openable/closable wall section.

3. The portable livestock corral of claim 1 wherein a first one of the bud box panels is selectively and detachably connectable to a corral panel among said one of the hinged groupings of the first set of corral panels, independently of the hinged connections thereof, and a second one of the bud box panels is connected or connectable to a sidewall component of the alleyway at the first side thereof.

4. The portable livestock corral of claim 1 wherein at least one of the bud box panels is a gated bud box panel that comprises an openable/closable gate that, in a deployed state of the bud box panels, resides at a different side thereof than both the first sidewall structure of the alleyway and any panel of said one of the hinged together groups of the first set of corral panels that also bounds the bud box.

5. The portable livestock corral of claim 4 wherein said bud box panels are configured to place the gated bud box panel in opposing and facing relation to the second openable/closable wall section when said bud box panels are in the first working position.

6. The portable livestock corral of claim 2 wherein said first one of the bud box panels is a gated bud box panel that comprises an openable/closable gate therein.

7. The portable livestock corral of claim 1 wherein the bud box panels are configured to occupy an interior corner of the first livestock pen in the first working position, whereby the enclosed bud box is a partial alleyway-adjacent corner of the first livestock pen that is divided from a remainder of the first livestock pen by the deployed bud box panels.

8. The portable livestock corral of claim 1 wherein the first set of corral panels include a gated corral panel with an openable/closable man gate that, in the working position of the bud box panels, is openable to gain human access the enclosed bud box through an opening that is framed by said gated corral panel is openable and closable by said man gate.

9. The portable livestock corral of claim 1 comprising a safety bar of length exceeding a width of the alleyway between the sidewall structures thereof, and usable for mechanical constraint of the first and second sets of corral panels in stowed transport positions respectively folded up alongside the first and second sidewall structures, said safety bar being insertable through aligned openings the sets of corral panels and the sidewall structures to attain a working position spanning collectively therethrough in the lateral direction, and comprising a pair of stops usable at or adjacent respective ends of the safety bar in said working position to both block sliding of the safety bar out of said working position, and block outward swinging of stowed corral panels.

10. The portable livestock corral of claim 9 wherein at least one of the stops is coupled to a main elongated member of said safety bar, and movable relative thereto between a stopping position of obstructing relation to both said sliding of the safety bar and said outward swinging of the stowed corral panels, and a release position of non-obstructing relation thereto.

11. The portable livestock corral of claim 10 wherein said at least one of the stops lies more parallel to than transversely of the main elongated member of the safety bar in said release position.

12. The portable livestock corral of claim 10 wherein said at least one of the stops resides more internally of the safety bar in the release position than in the stopping position.

13. The portable livestock corral of claim 1 wherein set of bud box panels comprises:

a first bud box panel having a proximal end and a distal end of opposing relation to said proximal end; and a second bud box panel having a proximal end and an opposing distal end of opposing relation to said proximal end;

among which:

the proximal end of the first bud box panel is configured for selective and detachable connection to a first corral panel, among said one of the hinged-together groupings of the first set of corral panels, in a first secured position defining a first side of the enclosed bud box;

the distal end of the first bud box panel is connected or connectable to the distal end of the second bud box panel in establishment of said first working position of said set of bud box panels;

the proximal end of the second bud box panel is connected or connectable to a sidewall component of the alleyway at the first side thereof in establishment of a second secured position defining a second side of the enclosed bud box in spanning relationship between said sidewall component of the alleyway and the distal end of the first bud box panel; and a detachability of the proximal end of the first bud box panel from said first corral panel enables extraction of the first bud box panel from the first secured position, and folding up of a second corral panel, that is hinged to the first corral panel, into a folded position alongside the first corral panel.

14. The portable livestock corral of claim 1 wherein one of the bud box panels is configured for detachable connection to one of the corral panels among said one of the hinged-together groupings of the first set of corral panels at an intermediate location on said one of the corral panels that is situated between, and in distanced relation to each of, two opposing ends of said one of the corral panels.

15. The portable livestock corral of claim 14 wherein said one of the corral panels has a man gate therein at a location residing between said intermediate location where the one of the bud box panels is detachably connectable and a proximal end of said one of the corral panels that is coupled to the alleyway.

16. The portable livestock corral of claim 1 wherein one of the bud box panels is configured for detachable connection to a location on one of the corral panels among said one of the hinged-together groupings of the first set of corral panels, and said one of the corral panels has a man gate therein that resides between said location and a proximal end of said one of the corral panels that is coupled to the alleyway.

17. A portable livestock corral comprising:
a towable frame of elongated character in a longitudinal direction, said towable frame having two ends of opposing relation to one another in said longitudinal direction, and first and second sides of opposing relation to one another in a lateral direction of transverse relation to said longitudinal direction;
first and second sidewall structures of erect relationship to said towable frame at the first and second sides thereof, respectively, and thereby respectively denoting first and second sides of a longitudinally oriented alleyway delimited between said first and second sidewall structures;
a collection of corral panels stowable in a manner carried by said towable frame for transport therewith, and deployable externally of the alleyway in cooperating relationship therewith to delimit at least one livestock pen from which livestock are admissible into an undivided section of the alleyway via at least one openable/closable entrance thereto;
wherein the alleyway, in addition to said undivided section, includes a divided dual-alley section that spans longitudinally from said undivided section to a rear end of the alleyway and has a divider wall by which said divided dual-alley section is subdivided into two neighbouring alleys that run longitudinally alongside one another from said undivided section to the rear end of the alleyway, both of said neighbouring alleys terminate in respective rear exits at said rear end of the alley and both start at respective front entrances situated inside the alleyway at a rear end of the undivided section, where at least one of said respective front entrances is openable and closeable to said undivided section of the alleyway to enable selective admission of a livestock or human occupant to at least one of said neighbouring alleys from said undivided section, and closure of said at least one of the neighbouring alleys behind said livestock or human occupant once admitted.

18. The portable livestock corral of claim 17 wherein said divided dual-alley section is further characterized by inclusion of a lockable gate at said front entrance of said at least one of the two neighbouring alleys, and said lockable gate is movable between, and lockable in each of, a plurality of different positions operable to open and close the front entrance of said at least one of the two neighbouring alleys.

19. The portable livestock corral of claim 18 wherein said different positions of the lockable gate include two different single-alley closing positions each closing off the front entrance of only a respective one of the two neighbouring alleys.

20. The portable livestock corral of claim 18 wherein said different positions include a fully open position in which the front entrances of both of the two neighbouring alleys are open.

21. The portable livestock corral of claim 18 wherein said lockable gate is a swing gate pivotable about an upright axis between said plurality of different positions.

22. The portable livestock corral of claim 18 wherein said lockable gate is configured to form a parallel extension of the divider wall, when opened.

23. A portable livestock corral comprising:
a towable frame of elongated character in a longitudinal direction, said towable frame having two ends of opposing relation to one another in said longitudinal direction, and first and second sides of opposing relation to one another in a lateral direction of transverse relation to said longitudinal direction;
first and second sidewall structures of erect relationship to said towable frame at the first and second sides thereof, respectively, and thereby respectively denoting first and second sides of a longitudinally oriented alleyway delimited between said first and second sidewall structures, said first and second sidewall structures having at least a first pair of aligned openings therein of aligned relation to one another across the alleyway;
a first set of corral panels deployable externally of the alleyway outside the first sidewall structure thereof to cooperatively delimit a first livestock pen;
a second set of corral panels deployable externally of the alleyway outside the second sidewall structure thereof to cooperatively delimit a second livestock pen residing across the alleyway from said first livestock pen; and
a safety bar of length exceeding a width of the alleyway between said first and second sidewall structure and usable for mechanical constraint of the first and second sets of corral panels in stowed transport positions in which the first and second sets of corral panels are respectively folded up alongside the first and second sidewall structures at areas overlying the aligned openings in the first and second sidewall structures, said safety bar being removably insertable through a second pair of aligned openings in the sets of corral panels and the first pair of aligned openings in the sidewall structures to attain a working position spanning collectively through the alleyway, the sidewall structures and the folded sets of corral panels in the lateral direction, and said safety bar comprising a pair of stops usable at or adjacent respective ends of the safety bar in said working position to both block sliding of the safety bar out of said working position, and block outward swinging of stowed corral panels.

* * * * *